US012331211B2

United States Patent
Ozaki et al.

(10) Patent No.: US 12,331,211 B2
(45) Date of Patent: Jun. 17, 2025

(54) TRANSMISSION BELT CORE WIRE PRODUCTION METHOD, TRANSMISSION BELT PRODUCTION METHOD, PROCESSING AGENT AND PROCESSING KIT

(71) Applicant: Mitsuboshi Belting Ltd., Kobe (JP)

(72) Inventors: Toshiki Ozaki, Hyogo (JP); Yorifumi Hineno, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 234 days.

(21) Appl. No.: 17/629,152

(22) PCT Filed: Jul. 8, 2020

(86) PCT No.: PCT/JP2020/026758
§ 371 (c)(1),
(2) Date: Jan. 21, 2022

(87) PCT Pub. No.: WO2021/014980
PCT Pub. Date: Jan. 28, 2021

(65) Prior Publication Data
US 2022/0267634 A1 Aug. 25, 2022

(30) Foreign Application Priority Data

Jul. 24, 2019 (JP) ................................. 2019-136378
Jun. 26, 2020 (JP) ................................. 2020-110650

(51) Int. Cl.
*C09D 123/16* (2006.01)
*D06M 15/227* (2006.01)
(Continued)

(52) U.S. Cl.
CPC ......... *C09D 123/16* (2013.01); *D06M 15/227* (2013.01); *D06M 15/693* (2013.01);
(Continued)

(58) Field of Classification Search
CPC .. D06M 15/55; D06M 15/227; D06M 15/693; D06M 15/41; C09D 123/16;
(Continued)

(56) References Cited

U.S. PATENT DOCUMENTS 4,861,820 A   8/1989   Toyoda et al.
5,246,735 A   9/1993   Takata et al.
(Continued)

FOREIGN PATENT DOCUMENTS

CN   1386787 A   12/2002
CN   1639292 A   7/2005
(Continued)

OTHER PUBLICATIONS

Machine translation of Japan 2008-169504, first published in Japanese Jul. 24, 2008, 16 pages. (Year: 2008).*

(Continued)

*Primary Examiner* — Katherine A Bareford
(74) *Attorney, Agent, or Firm* — Banner & Witcoff, Ltd.

(57) ABSTRACT

The present invention relates to a method of producing a cord for a power transmission belt, the method including: a first treatment step of treating an untreated yarn of a cord for a power transmission belt with a first treatment agent including a resin component (A) to obtain a first treated yarn; and a second treatment step of treating the first treated yarn with a second treatment agent including a condensate (B1) of resorcin and formaldehyde, an unmodified latex (B2), and an acid-modified diene-based polymer (B3) to obtain a second treated yarn.

9 Claims, 5 Drawing Sheets

(51) Int. Cl.
*D06M 15/693* (2006.01)
*D07B 5/00* (2006.01)
*F16G 1/10* (2006.01)
*F16G 5/08* (2006.01)

(52) U.S. Cl.
CPC ...... *D07B 5/006* (2015.07); *D07B 2501/2076* (2013.01); *F16G 1/10* (2013.01); *F16G 5/08* (2013.01)

(58) Field of Classification Search
CPC ............ D07B 5/006; D07B 2501/2076; B29D 29/10; B29D 29/103; F16G 1/10; F16G 5/08
See application file for complete search history.

(56) References Cited

U.S. PATENT DOCUMENTS

| | | | |
|---|---|---|---|
| 2002/0144779 | A1 | 10/2002 | Pelton |
| 2003/0027920 | A1 | 2/2003 | Kinoshita et al. |
| 2005/0147817 | A1 | 7/2005 | Pelton |
| 2005/0202916 | A1 | 9/2005 | Wu |
| 2006/0169408 | A1* | 8/2006 | Rutherford ................ C08J 5/06 152/565 |
| 2007/0155566 | A1 | 7/2007 | Wu |
| 2013/0078460 | A1 | 3/2013 | Tasaka et al. |
| 2017/0130014 | A1 | 5/2017 | Aogu et al. |
| 2018/0313028 | A1* | 11/2018 | Tomoda ............... D06M 15/693 |
| 2020/0262988 | A1 | 8/2020 | Anyaogu et al. |

FOREIGN PATENT DOCUMENTS

| | | | |
|---|---|---|---|
| CN | 1938460 | A | 3/2007 |
| CN | 108350644 | A | 7/2018 |
| JP | S63-057685 | A | 3/1988 |
| JP | H0365536 | A | 3/1991 |
| JP | 2000-169813 | A | 6/2000 |
| JP | 2005-511904 | A | 4/2005 |
| JP | 2005-519182 | A | 6/2005 |
| JP | 2006-176580 | A | 7/2006 |
| JP | 2007-528477 | A | 10/2007 |
| JP | 2008-169504 | A | 7/2008 |
| JP | 2009-203594 | A | 9/2009 |
| JP | 2011-038003 | A | 2/2011 |
| JP | 2011-231434 | A | 11/2011 |
| JP | 2016-145440 | A | 8/2016 |
| JP | 2017-082377 | A | 5/2017 |
| JP | 2019-504130 | A | 2/2019 |
| WO | 03048237 | A1 | 6/2003 |
| WO | 2009-139160 | A1 | 11/2009 |
| WO | 2011-151890 | A1 | 12/2011 |
| WO | WO-2017073647 | A1 * | 5/2017 ................ C08J 5/06 |

OTHER PUBLICATIONS

Machine translation of Japan 2016-145440, first published in Japanese Aug. 12, 2016, 26 pages. (Year: 2016).*
Jan. 19, 2023—(CA) Office Action—CA App 3, 147,399.
Mar. 31, 2023—(CN) Notification of First Office Action—CN App 202080052618.6, Eng Tran.
Jun. 30, 2023—(EP) Extended Search Report—EP App. 20843799.6.
Oct. 9, 2023—(CN) Notification of the Second Office Action—CN App 202080052618.6, Eng Tran.
Oct. 27, 2023—(CA) Office Action—CA App 3,147,399.
Sep. 24, 2020—International Search Report—Intl App PCT/JP2020/026758.
Dec. 15, 2020—(JP) Office Action—App 2020-110650.
Mar. 5, 2024—(CN) Decision of Rejection—CN App 202080052618.6, Eng Tran.

* cited by examiner

TRANSMISSION BELT CORE WIRE PRODUCTION METHOD, TRANSMISSION BELT PRODUCTION METHOD, PROCESSING AGENT AND PROCESSING KIT

CROSS REFERENCE TO RELATED APPLICATIONS

This is a U.S. National Phase Application under 35 U.S.C. § 371 of International Application No. PCT/JP2020/026758, filed Jul. 8, 2020, which claims priority to Japanese Application Nos. 2019-136378, filed Jul. 24, 2019, and 2020-110650, filed Jun. 26, 2020, which were published Under PCT Article 21 (2), the entire contents of which are incorporated herein by reference.

TECHNICAL FIELD

The present invention relates to a method of producing a cord used for a power transmission belt, a method of producing a power transmission belt, a treatment agent, and a treatment kit.

BACKGROUND ART

As a means for power transmission, a power transmission belt is used because of quietness and a high degree of freedom in layout. Examples of the power transmission belt include a toothed belt, which is a meshing power transmission belt, and a V-belt, a V-ribbed belt, and a flat belt, which are frictional power transmission belts. The V-belt is further classified into a wrapped V-belt in which the periphery of the belt is covered with fabric, and a raw-edge V-belt in which a frictional power transmission surface (V-shaped side surface) is formed of a rubber composition. As the raw-edge V-belt, there has been known a raw-edge cogged V-belt in which unevenness is provided on an inner peripheral side to improve flexibility, or a raw-edge double cogged V-belt in which unevenness is provided on an inner peripheral side and an outer peripheral side. In any of the power transmission belts, a structure in which a cord (twisted cord formed by twisting fibers) is embedded in an elastomer is common. In order to improve the adhesiveness with the elastomer, the cord is usually subjected to an adhesion treatment to have an adhesive layer.

When these power transmission belts are used by being attached to an engine or a continuously variable transmission (CVT) of a vehicle, heat resistance may become a problem. In recent years, heat dissipation has become difficult due to compactness of a layout and simplification of a cooling mechanism, and high heat resistance has also been required for the power transmission belt. As the elastomer constituting the power transmission belt, styrene-butadiene rubber (SBR), chloroprene rubber (CR), hydrogenated acrylonitrile-butadiene rubber (HNBR), and the like have been widely used, and in particular, in applications in which high heat resistance is required, the use of ethylene-propylene-diene terpolymer (EPDM) is also increasing. The EPDM is excellent in heat resistance because EPDM does not contain a double bond in a main chain, but is difficult to vulcanize with sulfur, and is usually crosslinked with an organic peroxide.

The EPDM crosslinked with an organic peroxide shows particularly high heat resistance, but has a problem that the EPDM is difficult to sufficiently improve the adhesiveness with a cord. Therefore, it is usual to provide a plurality of adhesive layers on the cord through a plurality of adhesive treatment steps. Typically, a method is used in which a cord is impregnated with a resin component such as epoxy or isocyanate in a first bath; a resorcin/formalin/latex mixed liquid (RFL), which is a mixture of a resin component and a rubber component, is attached to the cord in a second bath; and then the cord is over-coated with a mucilage in which a rubber component is dissolved in an organic solvent in a third bath. That is, the adhesive force between the fiber and the elastomer is improved by gradually changing the adhesive layer from the resin component to the rubber component. However, when such plural adhesion treatments are performed, there are problems such as a decrease in productivity and an influence on the environment due to the use of an organic solvent, and thus improvement is required.

As new adhesive components, maleic acid-modified polybutadiene and polycarbodiimide have been proposed.

JP-T-2005-511904 (Patent Literature 1) discloses, as a method for adhering a fiber to a rubber, a method including a step of treating with a primer agent containing ring-opened maleinated polybutadiene and a phenol derivative containing an electron-withdrawing group, and a step of treating with resorcin/formalin/latex preparation product (RFL). It is also disclosed that the primer agent may be in a form of an aqueous solution or an organic solution, and that the primer agent may be added to RFL. As the rubber, HNBR. SBR, and a Standard Malaysian rubber are described, and HNBR and SBR are used in examples. Examples of the phenol derivative include 4-chlorophenol, 4-bromophenol, and condensates of these substituted phenols with resorcin/formaldehyde and ethoxylated resorcin/formaldehyde.

JP-T-2019-504130 (Patent Literature 2) relates to an adhesive treatment of a polymer matrix and reinforcing fibers and discloses an aqueous adhesive composition containing water, an epoxy resin, a maleinated polybutadiene polymer electrolyte, and a curing agent (claim 15).

JP-A-2017-82377 (Patent Literature 3) discloses a method for producing a cord for a power transmission belt in which treatment is performed with a treatment agent containing a hydrophilic solvent and a rubber composition containing a condensate of resorcin and formaldehyde, a rubber component containing a carboxyl-modified latex, and a curing agent containing a polycarbodiimide resin having a plurality of carbodiimide groups.

CITATION LIST

Patent Literature

Patent Literature 1: JP-T-2005-511904 (claims 1, 17 and 19, paragraphs [0013] and [0019], Examples)
Patent Literature 2: JP-T-2019-504130 (claims 1 and 15)
Patent Literature 3: JP-A-2017-82377 (claim 1)

SUMMARY OF INVENTION

Technical Problem

In Patent Literature 1, HNBR or SBR, which is relatively excellent in adhesiveness, is used as the elastomer, and EPDM, which has poor adhesiveness, may not provide sufficient adhesive force. A phenol derivative containing an electron withdrawing group, which is an essential component, contains halogen having a large environmental load. In Patent Literature 2, a resorcin/formalin condensate (RF) or a resorcin/formalin/latex mixed liquid (RFL) is not used, and a difference in elastic modulus between a cord and a rubber cannot be smoothly linked by a single bath treatment, and a sufficient adhesive force cannot be obtained because of insufficient mediation from a resin component to a rubber component. Patent Literature 3 succeeds in improving the adhesive force between aramid fibers and EPDM, but it is still not sufficient for the recent demand for high heat resistant adhesiveness.

An object of the present invention is to provide a method of producing a cord for a power transmission belt, which is excellent in heat resistant adhesiveness to an elastomer in which a cord is embedded, with a small environmental load, a method of producing a power transmission belt, and a treatment agent and a treatment kit used in the method.

Another object of the present invention is to provide a method of producing a cord for a power transmission belt, a method of producing a power transmission belt, a treatment agent, and a treatment kit, which can improve the durability of the power transmission belt.

Solution to Problem

As a result of intensive studies to achieve the above object, the present inventors have found that when an untreated yarn of a cord for a power transmission belt is treated with a first treatment agent including a resin component and then treated with a second treatment agent including a condensate of resorcin and formaldehyde, an unmodified latex, and an acid-modified diene-based polymer, the load on the environment is small, and the heat resistant adhesiveness to an elastomer in which a cord is embedded can be improved, and have completed the present invention.

That is, a method of producing a cord for a power transmission belt according to the present invention includes a first treatment step of treating an untreated yarn of a cord for a power transmission belt with a first treatment agent including a resin component (A) to obtain a first treated yarn; and a second treatment step of treating the first treated yarn with a second treatment agent including a condensate (B1) of resorcin and formaldehyde, an unmodified latex (B2), and an acid-modified diene-based polymer (B3) to obtain a second treated yarn.

The production method according to the present invention may be a production method in which the resin component (A) includes a modified epoxy resin (A1-1) modified with an elastic polymer, a total ratio (in terms of solid content) of the condensate (B1) and the unmodified latex (B2) is 8 mass % to 25 mass % in the second treatment agent, and a ratio (in terms of solid content) of the acid-modified diene-based polymer (B3) is 2.5 mass % to 15 mass % in the second treatment agent.

In addition, the production method according to the present invention may be a production method in which the resin component (A) includes a condensate (A2-1) of resorcin and formaldehyde, a latex (A2-2), and a curing agent (A2-3) including a polycarbodiimide resin having a plurality of carbodiimide groups, a total ratio (in terms of solid content) of the condensate (B1) and the unmodified latex (B2) is 5 mass % to 25 mass % in the second treatment agent, and a ratio (in terms of solid content) of the acid-modified diene-based polymer (B3) is 1 mass % to 15 mass % in the second treatment agent.

In the production method according to the present invention, the acid-modified diene-based polymer (B3) may be carboxylic acid-modified polybutadiene. The mass (in terms of solid content) of the acid-modified diene-based polymer (B3) may be 0.05 to 2 times the total mass (in terms of solid content) of the condensate (B1) and the unmodified latex (B2). The first treatment agent and the second treatment agent may be treatment agents containing no halogen. The production method according to the present invention may be a method that does not include a step of performing an overcoat treatment with a mucilage.

The present invention also includes a treatment agent for treating an untreated yarn of a cord for a power transmission belt. The treatment agent includes a condensate (B1) of resorcin and formaldehyde, an unmodified latex (B2), and an acid-modified diene-based polymer (B3). In this treatment agent, the cord for a power transmission belt may be a cord that comes into contact with a rubber layer including an ethylene-α-olefin elastomer.

The present invention also includes a treatment kit for treating an untreated yarn of a cord for a power transmission belt. The treatment kit includes a first treatment agent including a resin component (A); and a second treatment agent including a condensate (B1) of resorcin and formaldehyde, an unmodified latex (B2), and an acid-modified diene-based polymer (B3).

The present invention also includes a method of producing a power transmission belt including an embedding step of embedding a cord obtained by the above production method in a rubber layer along a longitudinal direction of a belt. The rubber layer may include an ethylene-α-olefin elastomer. The power transmission belt may be a raw-edge V-belt.

Advantageous Effects of Invention

In the present invention, an untreated yarn of a cord for a power transmission belt is treated with the first treatment agent including a resin component, and then treated with the second treatment agent including a condensate of resorcin and formaldehyde, an unmodified latex, and an acid-modified diene-based polymer, so that a cord for a power transmission belt having excellent heat resistant adhesiveness to an elastomer in which a cord is embedded can be produced with a small environmental load (for example, with a reduced amount of an organic solvent to be used). Therefore, it is possible to provide a cord which is capable of improving the durability of the power transmission belt by a method in which the amount of the organic solvent to be used is reduced and the load on the environment is small.

DESCRIPTION OF EMBODIMENTS

<Method for Producing Cord>

Figure 1:
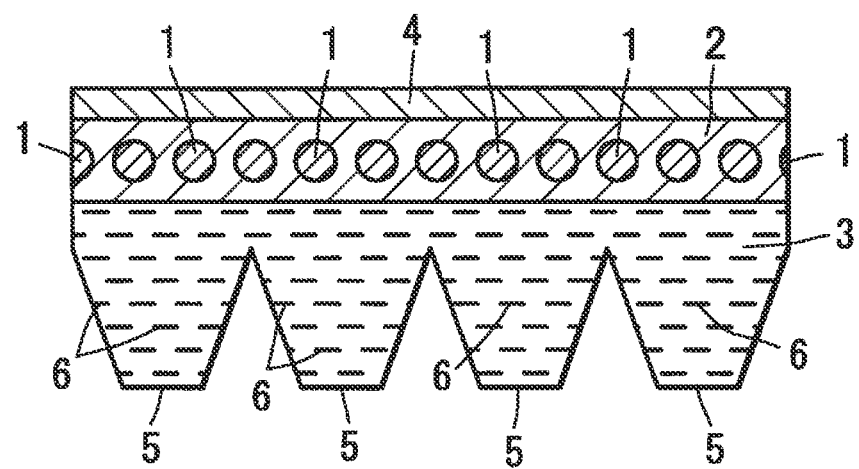
FIG. 1 is a schematic cross-sectional view showing an example of a power transmission belt including a cord for a power transmission belt obtained by a production method according to the present invention.

In the present invention, a cord is produced through a first treatment step of treating an untreated yarn of a cord for a power transmission belt with a first treatment agent containing a resin component (A) to obtain a first treated yarn, and a second treatment step of treating the first treated yarn with a second treatment agent containing a condensate (B1) of resorcin and formaldehyde, an unmodified latex (B2), and an acid-modified diene-based polymer (B3) to obtain a second treated yarn.

[First Treatment Step]

(Untreated Yarn of Cord for Power Transmission Belt)

Examples of raw material fibers constituting an untreated yarn to be treated with the first treatment agent include a natural fiber (cotton, hemp, etc.), a regenerated fiber (rayon, acetate, etc.), a synthetic fiber (a polyolefin fiber such as polyethylene and polypropylene, a styrene-based fiber such as polystyrene, a fluorine-based fiber such as polytetrafluoroethylene, an acrylic fiber, a vinyl alcohol-based fiber such as polyvinyl alcohol, a polyamide fiber, a polyester fiber, a wholly aromatic polyester fiber, an aramid fiber, etc.), and an inorganic fiber (a carbon fiber, a glass fiber, etc.). These fibers may be used alone or in combination of two or more kinds thereof.

Among these fibers, from the viewpoint of high modulus, a polyester fiber [a polyalkylene allylate-based fiber such as a polyethylene terephthalate-based fiber (PET fiber), a polyethylene naphthalate-based fiber (PEN fiber), and a polytrimethylene terephthalate fiber (PTT fiber)] having $C_{2-4}$ alkylene allylate as a main constituent unit, such as ethylene terephthalate and ethylene-2,6-naphthalate, a synthetic fiber such as an aramid fiber, an inorganic fiber such as a carbon fiber, and the like are generally used. From the viewpoint of high tensile strength, high tension, and high load requirements, an aramid fiber (aromatic polyamide fiber) is preferably contained, and a para-aramid fiber is particularly preferably contained. Examples of the para-aramid fiber include a polyparaphenylene terephthalamide fiber (e.g., "Twaron (registered trademark)" manufactured by Teijin Ltd., and "Kevlar (registered trademark)" manufactured by Du Pont-Toray Co., Ltd.), and a copolymer fiber of polyparaphenylene terephthalamide and 3,4'-oxydiphenylene terephthalamide (e.g., "Technora (registered trademark)" manufactured by Teijin Ltd.).

The untreated yarn to be treated with the first treatment agent may be in a state of a raw yarn to which twisting is not applied, or may be in a state of a twisted yarn in which twisting is applied to a raw yarn (untreated twisted yarn cord) In the present invention, even in the case of a twisted yarn cord, the impregnation of the twisted yarn cord (between monofilaments and/or between multifilaments) with the first treatment agent is excellent, so that the adhesiveness between fibers can be improved.

In the raw yarn, a multifilament yarn preferably contains a monofilament yarn of a para-aramid fiber, and may contain a monofilament yarn of another fiber (polyester fiber or the like) as necessary. A ratio of the para-aramid fiber is 50 mass % or more (particularly 80 mass % to 100 mass %) with respect to the total monofilament yarn (multifilament yarn), and usually, the whole monofilament yarn may be composed of the para-aramid fiber.

The multifilament yarn includes a plurality of monofilament yarns, and include, for example, 100 to 5,000 monofilament yarns, preferably 300 to 2,000 monofilament yarns, more preferably 600 to 1,500 monofilament yarns, and most preferably 800 to 1,200 monofilament yarns from the viewpoint of durability of the power transmission belt.

An average fineness of the monofilament yarn may be, for example, 0.8 dtex to 10 dtex, preferably 0.8 dtex to 5 dtex, more preferably 1.1 dtex to 3 dtex, and most preferably 1.3 dtex to 2 dtex.

The twisted yarn cord may be a twisted yarn cord (single twisted yarn) formed by twisting at least one raw yarn right (S-twist) or left (Z-twist), but from the viewpoint of strength, a twisted yarn cord obtained by twisting a plurality of raw yarns is preferable.

The twisted yarn cord formed by twisting a plurality of raw yarns may be a twisted yarn cord (e.g., plied yarn, Koma twist yarn or Lang lay yarn) obtained by secondarily twisting a plurality of single twisted yarns as a primary twisted yarn, or may be a twisted yarn cord (e.g., corkscrew yarn) formed by aligning and twisting a single twisted yarn and a raw yarn (untwisted yarn). A single twist direction (primary twist direction) and a secondary twist direction may be either the same direction (Lang lay) or an opposite direction (plied twist). Among these, from the viewpoint of prevention of untwisting and excellent bending fatigue resistance, a twisted yarn cord (plied yarn or Lang lay yarn) that is twisted in two stages by secondarily twisting a plurality of single twisted yarns as a primary twisted yarn is preferable, and the plied yarn is particularly preferable.

The number of the primary twisted yarns constituting the twisted yarn cord may be, for example, 2 to 5, preferably 2 to 4, and more preferably 2 to 3. The number of twists of the primary twist may be, for example, 20 times/m to 300 times/m, preferably 30 times/m to 200 times/m, more preferably 50 times/m to 180 times/m, and most preferably 100 times/m to 160 times/m. In the primary twist, a twist factor (T.F.) represented by the following formula (1) can be selected from a range of, for example, about 0.01 to 10, and is preferably about 1 to 6 in the case of a plied yarn, and preferably about 0.2 to 2 in the case of a Lang lay yarn.

$$\text{Twist factor (T.F.)} = [\text{Number of twists (times/m)} \times \sqrt{\text{Total fineness (tex)}}]/960 \tag{1}$$

The number of twists of the secondary twist is not particularly limited, and may be, for example, 30 times/m to 300 times/m, preferably 50 times/m to 250 times/m, more preferably 150 times/m to 230 times/m, and most preferably 180 times/m to 220 times/m. In the secondary twist, the twist factor (T.F.) represented by the following formula (1) can be selected from a range of, for example, about 0.01 to 10, and is preferably about 1 to 6 in the case of a plied yarn, and preferably about 2 to 5 in the case of a Lang lay yarn.

An average diameter of the untreated twisted yarn cord of a cord for a power transmission belt which is secondarily twisted may be, for example, about 0.2 mm to 3.5 mm, preferably about 0.4 mm to 3 mm, and more preferably about 0.5 mm to 2.5 mm.

In a case where a twisted configuration of a twisted yarn cord formed by twisting a plurality of raw yarns is represented by (the number of raw yarns aligned in primary twist)×(the number of primary twisted yarns aligned in secondary twist), the twisted yarn cord may have a configuration of 1×2, 1×3, 1×5, 2×3, 2×5, 3×5, etc.

(First Treatment Agent)

The first treatment agent (or pretreatment agent) may be any treatment agent as long as the treatment agent contains the resin component (A), and may be a treatment agent containing a common adhesive resin or the like. From the viewpoint of improving the heat resistant adhesiveness between the cord and the elastomer, a first treatment agent (A1) containing a modified epoxy resin (A1-1) modified with an elastic polymer as the resin component (A), or a first treatment agent (A2) containing a condensate (A2-1) of resorcin and formaldehyde, a latex (A2-2), and a curing agent (A2-3) containing a polycarbodiimide resin having a plurality of carbodiimide groups as the resin component (A) is preferable.

(A1) First Treatment Agent

The first treatment agent (A1) preferably further contains a curing agent (A1-2) and an organic solvent (A1-3) in addition to the modified epoxy resin (A1-1) modified (toughened) with an elastic polymer.

(A1-1) Modified Epoxy Resin

The modified epoxy resin (A1-1) may be an epoxy resin obtained by modifying an epoxy group (glycidyl group, etc.) derived from an epoxy resin having two or more epoxy groups in a molecule with an elastic polymer, and is particularly preferably a modified epoxy resin obtained by modifying an end of an epoxy resin with an elastic polymer.

In such a modified epoxy resin, the elastic polymer is not particularly limited as long as the elastic polymer is a polymer that is more flexible than the epoxy resin, and various rubbers, elastomers, a soft resin, and the like can be used. Examples thereof include polybutadiene, nitrile rubber (NBR), carboxyl group-terminated NBR, and polyurethane elastomer. These elastic polymers may be used alone or in combination of two or more kinds thereof. Among these elastic polymers, NBR, carboxyl group-terminated NBR, and polyurethane elastomer are preferable, and NBR, which is a copolymer of butadiene and acrylonitrile, is particularly preferable from the viewpoint of adhesiveness to the elastomer in which a cord is embedded.

The epoxy resin serving as a base of the modified epoxy resin is not particularly limited, and may be any of an aliphatic epoxy resin [a reaction product of aliphatic polyols (e.g., diols such as ethylene glycol, propylene glycol, neopentyl glycol, polyethylene glycol, and polypropylene glycol, triols such as glycerin) and halogen-containing epoxy compounds (e.g., epichlorohydrin)], an alicyclic epoxy resin (dicyclopentadiene type epoxy resins, etc.), an aromatic epoxy resin, and the like.

Examples of the aromatic epoxy resin include a bisphenol type epoxy resin [a reaction product of bisphenols (or alkylene oxide adducts thereof) and a halogen-containing epoxy compound (epichlorohydrin, etc.)], a naphthalene type epoxy resin (e.g., diglycidyloxynaphthalene), a reaction product of benzenediol (e.g., hydroquinone) and a halogen-containing epoxy compound (epichlorohydrin, etc.), and a novolak type epoxy resin [a reaction product of a novolak resin (phenol novolak and cresol novolak, etc.) and a halogen-containing epoxy compound (epichlorohydrin, etc.) and the like].

In the bisphenol type epoxy resin, examples of bisphenols include bisphenols (4,4'-dihydroxybiphenyl, etc.), bis(hydroxyphenyl)alkanes [bis(hydroxyphenyl) $C_1$-10 alkanes such as bis(4-hydroxyphenyl)methane (bisphenol F), 1,1-bis(4-hydroxyphenyl)ethane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)octane, 2,2-bis(3,5-dimethyl-4-hydroxyphenyl)propane, 2,2-bis(3-cyclohexyl-4-hydroxyphenyl)propane, bis(4-hydroxyphenyl) diphenylmethane, 2,2-bis(3,5-dichloro-4-hydroxyphenyl) propane, 2,2-bis(3,5-dibromo-4-hydroxyphenyl)propane], bis(hydroxyphenyl)alkanes (e.g., 1,1-bis(4-hydroxyphenyl) cyclohexane, 1,1-bis(4-hydroxyphenyl)-3,3,5-trimethylcyclohexane), bis(hydroxyphenyl)ethers (e.g., 4,4'-dihydroxydiphenyl ether), bis(hydroxyphenyl)sulfones (e.g., 4,4'-dihydroxydiphenyl sulfone), bis(hydroxyphenyl)sulfoxides (e.g., 4,4'-dihydroxydiphenyl sulfoxide), and bis(hydroxyphenyl)sulfides (e.g., 4,4'-dihydroxydiphenyl sulfide).

These epoxy resins can be used alone or in combination of two or more kinds thereof. Among these epoxy resins, an aromatic epoxy resin (a reaction product of polyvalent phenol and a halogen-containing epoxy compound, etc.) is preferable, and a bisphenol type epoxy resin (a bisphenol F type epoxy resin and/or a bisphenol A type epoxy resin) is particularly preferable from the viewpoint of excellent adhesiveness to a para-aramid fiber.

The modified epoxy resin (A1-1) obtained by modifying such an epoxy resin with the elastic polymer can also be used alone or in combination of two or more kinds thereof.

The modified epoxy resin (A1-1) may usually have two or more epoxy groups in the molecule. The epoxy equivalent of such a modified epoxy resin may be, for example, 100 g/eq to 1000 g/eq, preferably 120 g/eq to 800 g/eq, and more preferably 150 g/eq to 600 g/eq (particularly 200 g/eq to 500 g/eq), depending on the type of the epoxy resin. When the epoxy equivalent is too small, the force for adhering the fibers may be reduced, and when the epoxy equivalent is too large, the bending fatigue resistance of the belt may be reduced.

A molecular weight of the modified epoxy resin [in the case of a polymer type, the average molecular weight (mass, weight average molecular weight, etc.)] is not particularly limited, and can be selected from a range of, for example, about 300 to 3000. In the present invention, the weight average molecular weight may be measured in terms of polystyrene by gel permeation chromatography (GPC), for example.

Examples of commercially available products of the rubber (NBR)-modified epoxy resin include EPR-2000 (manufactured by ADEKA Corporation), EPR-4030 (manufactured by ADEKA Corporation), EPR-4033 (manufactured by ADEKA Corporation), and EPB-13 (manufactured by Nippon Soda Co., Ltd.).

(A1-2) Curing Agent

The curing agent (A1-2) may be a curing agent commonly used as a curing agent for an epoxy resin. The curing agent may be a latent curing agent.

Among these curing agents, tertiary amines are preferable from the viewpoint of handleability and the like. Examples of the tertiary amines include aliphatic amines such as triethylamine, triethanolamine, and dimethylaminoethanol, and amines having an aromatic ring such as benzyldimethylamine, 2,4,6-tris(dimethylaminomethyl)phenol, and 1,8-diazabicyclo[5.4.0]undecene-1. These tertiary amines may be used alone or in combination of two or more kinds thereof. Among these tertiary amines, tertiary amines having an aromatic ring such as 2,4,6-tris(dimethylaminomethyl) phenol are particularly preferable.

The ratio of the curing agent may be 10 parts by mass or less with respect to 100 parts by mass of the modified epoxy resin, and is, for example, 1 part by mass to 10 parts by mass, preferably 2 parts by mass to 8 parts by mass, and more preferably 3 parts by mass to 6 parts by mass. When the ratio of the curing agent is too small, the adhesiveness between fibers may be reduced, and conversely, when the ratio is too large, the adhesiveness to the elastomer and the flexibility of the cord may be reduced.

(A1-3) Organic Solvent

When the first treatment agent (A1) contains the organic solvent (A1-3), the viscosity of the treatment agent can be reduced, and the modified epoxy resin (A1-1) and the curing agent (A1-2) can be dissolved or uniformly dispersed in the organic solvent, so that the fibers of the twisted yarn cord can be uniformly impregnated with the modified epoxy resin (A1-1) and the curing agent (A1-2).

Examples of the organic solvent (A1-3) include chain ketones (acetone, methyl ethyl ketone, methyl isobutyl ketone, etc.), cyclic ketones (cyclohexanone, etc.), chain ethers (diethyl ether, etc.), cyclic ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), esters (methyl acetate, ethyl acetate, butyl acetate, etc.), aliphatic alcohols (ethanol, isopropanol, butanol, etc.), alicyclic alcohols (cyclohexanol, etc.), polyhydric alcohols (ethylene glycol, propylene glycol, polyethylene glycol, polypropylene glycol, etc.), cellosolves (methyl cellosolve, ethyl cellosolve, propylene glycol monomethyl ether, etc.), cellosolve acetates, sulfoxides (dimethyl sulfoxide, etc.), and amides (dimethylformamide, dimethylacetamide, etc.).

These organic solvents may be used alone or in combination of two or more kinds thereof. Among these organic solvents, aromatic hydrocarbons such as toluene are widely used.

The solid content (active ingredient) concentration of the first treatment agent may be, for example, 1 mass % to 70 mass %, preferably 3 mass % to 50 mass %, more preferably 4 mass % to 40 mass %, and most preferably 5 mass % to 30 mass %. When the solid content concentration is too low, the adhesive force between the fibers may be reduced, and when the solid content concentration is too high, the impregnability of the treatment agent into the fibers may be reduced.

(A1-4) Other Additives

The first treatment agent (A1) may contain, as other additives (A1-4), a general-purpose epoxy resin that is not modified with an elastic polymer (such as a bisphenol type epoxy resin), a reactive diluent (such as a curing accelerator, a polyglycidyl ether having a low viscosity, or a monoglycidyl ether), a common additive (such as an adhesion improver, a filler, an anti-aging agent, a lubricant, a tackifier, a stabilizer, a coupling agent, a plasticizer, or a colorant), and the like, as long as the effects of the present invention are not impaired.

The ratio of the other additives (A1-4) may be 30 mass % or less with respect to the total amount of the first treatment agent (A1), and is, for example, 0.01 mass % to 30 mass %, preferably 0.05 mass % to 20 mass %, and more preferably 0.1 mass % to 10 mass %.

The first treatment agent (A1) preferably contains substantially no halogen, and particularly preferably contains no halogen, from the viewpoint of reducing environmental load. In the present application, the phrase "contains substantially no halogen" means that halogen is not intentionally contained, and specifically means that incorporation of halogen is allowed when the content is 0.5 mass % or less in the first treatment agent (A1) as inevitable impurities.

(A2) First Treatment Agent

The first treatment agent (A2) preferably further contains a hydrophilic solvent (A2-4) in addition to a condensate (A2-1) of resorcin and formaldehyde, a latex (A2-2), and a curing agent (A2-3) containing a polycarbodiimide resin having a plurality of carbodiimide groups.

(A2-1) Condensate of Resorcin and Formaldehyde (RF Condensate)

The first treatment agent (A2) includes a condensate (RF condensate) (A2-1) of resorcin (R) and formaldehyde (F). The RF condensate (A2-1) is excellent in compatibility with a latex, particularly a carboxyl-modified latex, and can form a flexible coating film.

The RF condensate (A2-1) is not particularly limited, and examples thereof include a novolac type, a resol type, and a combination thereof.

The RF condensate (A2-1) may be, for example, a reaction product (e.g., initial condensate or prepolymer) produced by reacting resorcin with formaldehyde in the presence of water and a base catalyst (alkali metal salt such as sodium hydroxide; an alkaline earth metal salt; ammonia, etc.). In addition, as long as the effect of the present invention is not inhibited, an aromatic monool such as phenol or cresol may be used in combination with resorcin, or an aromatic diol or an aromatic polyol such as catechol or hydroquinone may be used in combination with resorcin. As formaldehyde, a condensate of formaldehyde (for example, trioxane, paraformaldehyde) may be used, or an aqueous solution of formaldehyde (formalin, etc.) may be used.

The ratio (usage ratio) of resorcin to formaldehyde can be selected, for example, from a range of the former/the latter (molar ratio) of about 1/0.1 to 1/5, and in the case of producing a mixture of a resol type and a novolac type, the molar ratio of both may be, for example, the former/the latter of about 1/0.3 to 1/1, preferably about 1/0.4 to 1/0.95, and more preferably about 1/0.5 to 1/0.9. When the ratio of formaldehyde is too large, there is a risk of contamination by residual formaldehyde, and on the other hand, when the ratio of formaldehyde is too small, there is a risk that the content of the resol type RF condensate is insufficient and the mechanical properties of the cured product are deteriorated.

The ratio of the RF condensate (A2-1) (including latex, the ratio in terms of solid content; the same applies hereinafter) is, for example, 1 part by mass to 100 parts by mass, preferably 3 parts by mass to 80 parts by mass, more preferably 5 parts by mass to 50 parts by mass, still more preferably 10 parts by mass to 40 parts by mass, and most preferably 20 parts by mass to 30 parts by mass with respect to 100 parts by mass of the latex (A2-2). When the ratio of the RF condensate (A2-1) is too large, the cured product to be produced tends to be rigid, and the flexibility may be reduced. On the other hand, when the ratio of the RF condensate (A2-1) is too small, the mechanical properties of the cured product may be deteriorated.

(A2-2) Latex

As the latex (A2-2), a common rubber component can be used. The common rubber component is not particularly limited, and examples thereof include a diene-based rubber [natural rubber, isoprene rubber, butadiene rubber, styrene-butadiene rubber (SBR latex), styrene-butadiene-vinylpyridine terpolymer latex (VP latex), acrylonitrile-butadiene rubber (NBR latex), hydrogenated nitrile rubber (H-NBR latex), etc.], an olefin rubber [e.g., ethylene-α-olefin-based rubbers (ethylene-α-olefin elastomers) such as ethylene-propylene copolymer (EPM) and ethylene-propylene-diene terpolymer (EPDM); a polyoctenylene rubber; an olefin-vinyl ester copolymer such as ethylene-vinyl acetate copolymer rubber (EAM), etc.], an acrylic rubber, a silicone rubber, and an urethane rubber.

Furthermore, the latex (A2-2) may be a carboxyl-modified latex in which these rubber components are modified with a carboxyl group. A method of introducing a carboxyl group into the rubber component is not particularly limited, but a method of copolymerizing an unsaturated carboxylic acid having an ethylenically unsaturated bond is usually used. Examples of such an unsaturated carboxylic acid include an unsaturated monocarboxylic acid such as (meth)

acrylic acid and crotonic acid; an unsaturated polyvalent carboxylic acid such as fumaric acid, maleic acid, itaconic acid, and butenetricarboxylic acid; and a partially esterified product of an unsaturated polyvalent carboxylic acid such as monoethyl maleate and monomethyl itaconate. These unsaturated carboxylic acids may be used alone or in combination of two or more kinds thereof.

Specific examples of the carboxyl-modified latex include a carboxyl-modified acrylonitrile-butadiene copolymer latex (XNBR latex), a carboxyl-modified hydrogenated acrylonitrile-butadiene copolymer latex (XHNBR latex), a carboxyl-modified styrene-butadiene copolymer latex (XSBR latex), and a carboxyl-modified styrene-butadiene-vinylpyridine copolymer latex (XVP latex).

These latexes can be used alone or in combination of two or more kinds thereof. Among these, a carboxyl-modified latex is preferable from the viewpoint that the strength of the coating film formed by the first treatment agent (A2) can be improved and the flexibility of the latex can also be improved, and an XNBR latex is particularly preferable from the viewpoint that the adhesiveness to the elastomer is excellent.

(A2-3) Curing Agent

The curing agent (A2-3) contains a polycarbodiimide resin having a plurality of carbodiimide groups. In particular, in the case where the latex (A2-2) is a carboxyl-modified latex, by using the polycarbodiimide resin as the curing agent, the latex is crosslinked and reinforced by a crosslinking reaction between a carboxyl group of the latex and a carbodiimide group, and the coating film to be formed can be toughened. Furthermore, when the cord contains aramid fibers, the following chemical structural adhesion (chemical bond or intermolecular interaction) acts between the polycarbodiimide resin and the aramid fibers, and the aramid fibers can be more firmly fixed.

(1) Chemical adhesion in which a carbodiimide group of a polycarbodiimide resin is chemically reacted with and bonded to a residual amino group and/or a carboxyl group of an aramid fiber (2) Chemical adhesion due to intermolecular interaction (hydrogen bond) between the carbodiimide group of the polycarbodiimide resin and the amide bond of the aramid fiber.

The polycarbodiimide resin is not particularly limited as long as the polycarbodiimide resin has a plurality of carbodiimide groups (—N=C=N—), and examples thereof include a resin (or oligomer) having a repeating unit represented by the following formula (I).

—(N=C=N—R)— (I)

where R represents a divalent hydrocarbon group which may have a substituent.

In R in the formula (I), examples of the divalent hydrocarbon group include an aliphatic hydrocarbon group, an alicyclic hydrocarbon group, and an aromatic hydrocarbon group.

Examples of the aliphatic hydrocarbon group include an alkylene group, an alkenylene group, and an alkynylene group. Examples of the alkylene group include a $C_{1-20}$ alkylene group such as a methylene group, an ethylene group, a propylene group, a trimethylene group, a butylene group, a tetramethylene group, a hexamethylene group, an isohexylene group, an octamethylene group, an isooctylene group, a decamethylene group, and a dodecamethylene group. Examples of the alkenylene group include a $C_{2-20}$ alkenylene group such as a vinylene group, an arylene group, a methalylene group, a 1-propenylene group, an isopropenylene group, a butenylene group, a pentenylene group, and a hexenylene group. Examples of the alkynylene group include a $C_{2-20}$ alkynylene group such as an ethynylene group and a propynylene group.

Examples of the alicyclic hydrocarbon group include a $C_{3-12}$ cycloalkylene group such as a cyclopropylene group, a cyclobutylene group, a cyclopentylene group, a cyclohexylene group, and a cyclododecane-diyl group; a $C_{3-12}$ cycloalkenylene group such as a cyclohexenylene group; and a $C_{4-15}$ crosslinked cyclic hydrocarbon group such as a bicycloheptanylene group and a bicycloheptenylene group.

Examples of the aromatic hydrocarbon group include a $C_{6-14}$ arylene group such as a phenylene group and a naphthylene group.

Furthermore, the hydrocarbon group may be, for example, a group in which two or more kinds selected from an aliphatic hydrocarbon group, an alicyclic hydrocarbon group, and an aromatic hydrocarbon group are bonded to each other. Examples of the group in which an aliphatic hydrocarbon group and an alicyclic hydrocarbon group are bonded to each other include a dicycloalkylalkane-diyl group such as a cyclohexylene methylene group, a methylene cyclohexylene group, a dicyclohexylmethane-4,4'-diyl group, and a dicyclohexylpropane-4,4'-diyl group. Examples of the group in which an aliphatic hydrocarbon group and an aromatic hydrocarbon group are bonded to each other include a tolylene group, a xylylene group, and a diarylalkane-diyl group such as a diphenylmethane-4,4'-diyl group and a diphenylpropane-4,4'-diyl group.

Among these hydrocarbon groups, a $C_{1-10}$ alkylene group such as a methylene group or a hexamethylene group, a $C_{5-8}$ cycloalkylene group such as a cyclohexylene group, a $C_{6-10}$ arylene group such as a phenylene group, and a combination of these hydrocarbon groups (for example, a combination of a $C_{1-10}$ alkylene group such as a dicyclohexylmethane-4,4'-diyl group and a $C_{5-8}$ cycloalkylene group) are preferable.

Examples of a substituent of these hydrocarbon groups include an alkyl group (a $C_{1-10}$ alkyl group such as a methyl group, an ethyl group, a propyl group, an isopropyl group, and a butyl group), an alkenyl group, a cycloalkyl group, an aryl group, a halogen atom (such as a fluorine atom, a chlorine atom, a bromine atom, and an iodine atom), an oxo group, a hydroxyl group, a carbonyl group, a carboxyl group, an amino group, an alkoxy group (such as a $C_{1-6}$ alkoxy group such as a methoxy group and an ethoxy group), an acyl group, a mercapto group, a sulfonic acid (salt) group, an alkylthio group, an epoxy group, a cyano group, and a phosphoric acid group. These substituents may be used alone or in combination of two or more kinds thereof. Among these substituents, a $C_{1-4}$ alkyl group such as an isopropyl group, and a hydrophilic group such as a hydroxyl group, a carboxyl group, an amino group, and a sulfonic acid (salt) group are generally used.

The polycarbodiimide resin may be a homopolymer in which groups R constituting the repeating unit are the same hydrocarbon group, or may be a copolymer in which the groups R constituting the repeating unit are different hydrocarbon groups.

The polycarbodiimide resin is preferably a resin capable of forming micelles in the first treatment agent (A2) containing a hydrophilic solvent (A2-4) (particularly water) described later.

Since the polycarbodiimide resin is usually produced by condensation of an isocyanate compound, a terminal group of the polycarbodiimide resin may be an isocyanate group, or may be a group in which at least a part of the isocyanate group is blocked with a sequestering agent. The sequestering agent may be any compound (amine, alcohol, etc.) having a group reactive with an isocyanate group, but is preferably a sequestering agent having a hydrophilic group from the viewpoint of imparting hydrophilicity to the polycarbodiimide resin. Examples of such a sequestering agent include di $C_{1-4}$ alkylamino $C_{1-4}$ alkanol such as dimethylaminoethanol, di $C_{1-4}$ alkylamino $C_{1-4}$ alkylamine such as dimethylaminopropylamine, hydroxy $C_{1-4}$ alkanesulfonate such as sodium hydroxypropanesulfonate, and $C_{2-4}$ alkylene glycol mono $C_{1-4}$ alkyl ether such as ethylene glycol monoethyl ether.

Among these polycarbodiimide resins, an aqueous (water-soluble or water-dispersible) polycarbodiimide resin is preferred because the aqueous polycarbodiimide resin is excellent in dispersibility in the first treatment agent (A2) containing the hydrophilic solvent (A2-4) (particularly water) and can form micelles. The aqueous polycarbodiimide resin may be a polycarbodiimide resin in which the repeating unit have the hydrophilic group, or a polycarbodiimide resin in which a terminal group may be blocked with a hydrophilic group. From the viewpoint of excellent reactivity of the carbodiimide group, the aqueous polycarbodiimide resin may be a polycarbodiimide resin in which a terminal group is blocked with a hydrophilic group. When an aqueous polycarbodiimide resin is used as the polycarbodiimide resin, the aqueous polycarbodiimide resin can form micelles in a treatment agent, can suppress reactivity of a carbodiimide group in a hydrophilic solvent (in particular, in water), can recover the reactivity by drying, and can function as a crosslinking agent.

Even when the polycarbodiimide resin is a resin having no hydrophilic group, micelles can be formed in the first treatment agent by combining the polycarbodiimide resin with a surfactant. As the surfactant, common anionic surfactants, cationic surfactants, nonionic surfactants, amphoteric surfactants, and the like can be used.

The polycarbodiimide resin preferably has a carbodiimide group in the molecule at a predetermined ratio from the viewpoint of enhancing reactivity with the carboxyl group of the carboxyl-modified latex and efficiently crosslinking the carboxyl-modified latex. Specifically, the chemical formula amount (NCN equivalent) of the polycarbodiimide resin per 1 mol of carbodiimide groups may be 600 or less, and is, for example, 200 to 600, preferably 250 to 500, more preferably 300 to 450, and most preferably 350 to 450. When the NCN equivalent is too large, the reactivity with the carboxyl-modified latex may be decreased.

A degree of polymerization of the polycarbodiimide resin may be, for example, 2 or more, and is, for example, 2 to 100, preferably 3 to 50, more preferably 5 to 30, and most preferably 6 to 10.

As the polycarbodiimide resin, a commercially available polycarbodiimide resin can be used, and for example, "Carbodilite (registered trademark)" series (E-02, E-03A, E-05, and the like) manufactured by Nisshinbo Chemical Inc., which is commercially available as a crosslinking agent for an aqueous resin, and the like can be used.

The curing agent (A2-3) may contain other common curing agents as long as the effects of the present invention are not impaired. Other curing agents are preferably a curing agent having a plurality of groups reactive with a carboxyl group, and examples thereof include polyisocyanates, polyols, and polyamines. Among these, a blocked isocyanate (blocked polyisocyanate), which is a compound in which the isocyanate group of polyisocyanate is masked with a blocking agent to prevent the reaction, is preferable from the viewpoint of excellent permeability of the treatment agent between fibers. As the blocked isocyanate, a common blocked isocyanate can be used, and aliphatic polyisocyanate or a derivative thereof [e.g., hexamethylene diisocyanate (HDI) or a trimer thereof], aromatic polyisocyanate [tolylene diisocyanate (TDI), xylylene diisocyanate (XDI), etc.], or the like is widely used. As the blocking agent (protective agent), for example, oximes, lactams are widely used. A dissociation temperature of the blocked isocyanate may be, for example, 80° C. to 220° C., preferably 100° C. to 200° C., and more preferably 120° C. to 180° C., as long as the dissociation temperature is higher than a temperature (normal temperature) in an immersion treatment with the first treatment agent and equal to or lower than a heat treatment temperature after the immersion treatment. A ratio of the blocked isocyanate may be 1000 parts by mass or less with respect to 100 parts by mass of the polycarbodiimide resin, and is, for example, 10 parts by mass to 500 parts by mass, preferably 30 parts by mass to 300 parts by mass, and more preferably 50 parts by mass to 200 parts by mass.

The ratio of the polycarbodiimide resin with respect to the total curing agent (A2-3) is, for example, 10 mass % or more, preferably 50 mass % or more, more preferably 80 mass % or more (particularly 90 mass % or more), and may be 100 mass % (only the polycarbodiimide resin).

The ratio (ratio in terms of solid content) of the curing agent (A2-3) (particularly, polycarbodiimide resin) can be selected from a range of about 0.1 part by mass to 20 parts by mass with respect to 100 parts by mass of the latex (A2-2) (particularly, carboxyl-modified latex), and is, for example, 0.2 part by mass to 10 parts by mass, preferably 0.3 part by mass to 8 parts by mass, more preferably 0.5 part by mass to 5 parts by mass, and most preferably 0.8 part by mass to 3 parts by mass. When the ratio of the curing agent (A2-3) is too small, the fixing strength between fibers may be reduced, and when the ratio of the curing agent (A2-3) is too large, the flexibility may be reduced.

(A2-4) Hydrophilic Solvent

In the present invention, since the solvent of the first treatment agent (A2) is the hydrophilic solvent (A2-4), the environmental load is smaller than that of the organic solvent (particularly, a hydrophobic solvent). Examples of the hydrophilic solvent (A2-4) include water, lower aliphatic alcohols (e.g., $C_{1-4}$ alkyl alcohols such as ethanol and isopropanol), alkylene glycols (e.g., ethylene glycol, diethylene glycol, propylene glycol), and ketones (e.g., acetone). These hydrophilic solvents may be used alone or in combination of two or more kinds thereof. Among these, a hydrophilic solvent containing water is preferable, and water alone is particularly preferable.

The solid content (active ingredient) concentration in the first treatment agent (A2) may be, for example, 1 mass % to 70 mass %, preferably 5 mass % to 60 mass %, more preferably 10 mass % to 50 mass %, and most preferably 15 mass % to 40 mass %. When the solid content concentration is too low, there is a possibility that the fibers cannot be firmly adhered to each other, and when the solid content concentration is too high, there is a possibility that a mass of the solid content may be formed on the surface of the treated cord.

(A2-5) Other Additives

The first treatment agent (A2) may contain, as other additives (A2-5), a reactive binder resin (an epoxy compound, etc.), an organic solvent (a reactive diluent such as a monocarbodiimide compound, etc.), a common additive (a curing accelerator, an adhesion improving agent, a filler, an anti-aging agent, a lubricant, a tackifier, a stabilizer, a coupling agent, a plasticizer, a colorant, etc.), or the like as long as the effects of the present invention are not impaired.

The ratio of the other additives (A2-5) may be 30 mass % or less with respect to the total amount of the first treatment agent (A2), and is, for example, 0.01 mass % to 30 mass %, preferably 0.05 mass % to 20 mass %, and more preferably 0.1 mass % to 10 mass %.

The first treatment agent (A2) preferably contains substantially no halogen, and particularly preferably contains no halogen, from the viewpoint of reducing environmental load.

(Treatment Method)

A method for preparing the first treatment agent is not particularly limited, and the first treatment agent (A1) and the first treatment agent (A2) may be prepared, for example, by mixing all at once by stirring, or by dividing and mixing by stirring.

A method for treating the untreated yarn of the cord for a power transmission belt with the first treatment agent is not particularly limited, and examples thereof include spraying, coating, and immersing. Among these treatment methods, immersion is widely used. An immersion time is, for example, 1 second to 120 seconds, preferably 10 seconds to 60 seconds, and more preferably 20 seconds to 40 seconds.

After the untreated yarn of the cord for the power transmission belt is treated with the first treatment agent, the treated yarn may be dried as necessary. A drying temperature can be selected from a range of about 100° C. to 250° C., for example. A drying temperature of the first treatment agent (A1) may be preferably 150° C. to 240° C., and more preferably 170° C. to 210° C., and a drying temperature of the first treatment agent (A2) may be preferably 120° C. to 200° C., and more preferably 130° C. to 180° C. A drying time may be, for example, 5 seconds to 10 minutes, preferably 10 seconds to 5 minutes, and more preferably 20 seconds to 1 minute. Furthermore, the drying may be performed with applying tension to the untreated yarn of the cord for the power transmission belt. The tension may be, for example, about 5 N to 15 N, and preferably about 10 N to 15 N. When the treatment agent is dried under the action of tension, the treatment agent is easily adapted to the untreated yarn of the cord for the power transmission belt, the unevenness in twisting can be reduced, and the variation in the diameter of the twisted yarn cord caused by the unevenness in twisting can be reduced.

An average thickness of the coating film formed by the first treatment agent can be selected from a range of, for example, about 0.001 µm to 20 µm. An average thickness of the coating film formed by the first treatment agent (A1) may be, for example, 0.001 µm to 5 µm, preferably 0.01 µm to 3 µm, and more preferably 0.05 µm to 2 µm, and the average thickness of the coating film formed by the first treatment agent (A2) is, for example, 0.1 µm to 15 µm, preferably 1 µm to 12 µm, and more preferably 5 µm to 10 µm. When the thickness is too small, the adhesive strength between the cord and the elastomer may be reduced, and when the thickness is too large, the shear adhesive strength between the cord and the elastomer may be reduced.

In the present application, the thickness of the coating film can be measured by a method using a scanning electron microscope. Specifically, the thickness can be measured by observing a cross section of the treated cord treated with the treatment agent using a scanning electron microscope, measuring the thickness of the coating film at arbitrary 10 points, and determining an average value.

[Second Treatment Step]

In the case where the first treated yarn is a twisted yarn cord, the second treatment agent forms a coating film on the coating film of the first treatment agent, thereby improving the bundling property of the twisted yarn cord and the adhesion to the first treated yarn, and also improving the adhesiveness to the elastomer constituting the belt. In the present invention, since the two-bath treatment in which the first treatment agent and the second treatment agent are combined is used, it can be estimated that the fact that a difference in elastic modulus between the cord and the rubber can be smoothly connected is one factor for improving the adhesive force.

(Second Treatment Agent)

The second treatment agent includes the condensate (B1) of resorcin and formaldehyde, the unmodified latex (B2), and the acid-modified diene-based polymer (B3).

(B1) Condensate of Resorcin and Formaldehyde

The condensate (B1) of resorcin and formaldehyde can be selected from the RF condensates exemplified as the RF condensate (A2-1) of the first treatment agent (A2), including preferred embodiments.

The ratio (ratio in terms of solid content) of the RF condensate (B1) is, for example, 1 part by mass to 100 parts by mass, preferably 10 parts by mass to 80 parts by mass, more preferably 20 parts by mass to 70 parts by mass, still more preferably 30 parts by mass to 60 parts by mass, and most preferably 40 parts by mass to 50 parts by mass with respect to 100 parts by mass of the unmodified latex (B2). When the ratio of the RF condensate (B1) is too large, a cured product to be produced tends to be rigid, and the flexibility may be reduced. On the other hand, when the ratio of the RF condensate (B1) is too small, the mechanical properties of the cured product may be deteriorated.

(B2) Unmodified Latex

As the unmodified latex (B2), a common rubber component exemplified as the latex (A2-2) of the first treatment agent (A2) can be used. The rubber component may be used alone or in combination of two or more kinds thereof. Among the rubber components, a diene-based rubber is preferable, and a diene-based rubber having a vinylpyridine skeleton is particularly preferable, from the viewpoint of excellent adhesiveness to the first treatment agent and the elastomer.

The diene-based rubber having a vinylpyridine skeleton may contain, in addition to butadiene and vinylpyridine, a common copolymerization component [styrene, α-methylstyrene, chlorostyrene, (meth)acrylonitrile, (meth)acrylic acid, and (meth)acrylic acid alkyl ester, etc.]. Among these, an aromatic vinyl-based monomer such as styrene is widely used. That is, as a vinylpyridine-butadiene-based copolymer, for example, a butadiene-vinylpyridine copolymer, or a styrene-butadiene-vinylpyridine terpolymer (VP latex) is generally used.

In the second treatment agent, the total concentration of the RF condensate (B1) and the unmodified latex (B2) can be selected from the range of about 5 mass % to 25 mass %.

When the first treatment agent is the first treatment agent (A1), the total concentration (concentration in terms of solid content) of the RF condensate (B1) and the unmodified latex (B2) in the second treatment agent is, for example, 7 mass % to 30 mass % (e.g., 8 mass % to 25 mass %), preferably 10 mass % to 25 mass %, more preferably 11 mass % to 20 mass % (e.g., 11.5 mass % to 18 mass %), more preferably 13 mass % to 20 mass %, and most preferably 15 mass % to 18 mass %. When the total concentration is too low, the adhesiveness may be decreased, and when the total concentration is too high, probably due to the too thick coating film, the coating film may be peeled off by friction with a roller during the adhesion treatment of the cord to generate residue, which may make it difficult to continue the treatment.

When the first treatment agent is the first treatment agent (A2), the total concentration (concentration in terms of solid content) of the RF condensate (B1) and the unmodified latex (B2) in the second treatment agent is, for example, 5 mass % to 25 mass %, preferably 5.2 mass % to 15 mass %, more preferably 5.5 mass % to 10 mass %, still more preferably 6 mass % to 8 mass %, and most preferably 6.5 mass % to 7 mass %. When the total concentration is too low, the adhesiveness may be decreased, and when the total concentration is too high, probably due to the too thick coating film, the coating film may be peeled off by friction with a roller during the adhesion treatment of the cord to generate residue, which may make it difficult to continue the treatment.

Although the detailed mechanism is unknown, the first treatment agent (A2) has a greater effect of improving the adhesive force than the first treatment agent (A1), probably because the interaction between the first treatment agent and the second treatment agent contained in the first treated yarn is stronger in the first treatment agent (A2) than in the first treatment agent (A1). Therefore, with respect to the total concentration of the RF condensate (B1) and the unmodified latex (B2), even when the first treatment agent (A2) is lower than the first treatment agent (A1), the first treatment agent (A2) can obtain sufficient adhesive force, the lower limit value of the total concentration can be lowered to 5 mass %, and the material cost can be reduced. Furthermore, the first treatment agent (A2) has a significant environmental load reduction effect, as a hydrophilic solvent can be used for both the first and second treatment agents and no organic solvent is used.

(B3) Acid-Modified Diene-Based Polymer

The second treatment agent further contains the acid-modified diene-based polymer (B3) in addition to the RF condensate (B1) and the unmodified latex (B2), and by combining these components in a specific ratio, the adhesion to the first treated yarn (particularly, the coating film formed by the first treatment agent) can be improved, and the adhesiveness to the elastomer of the belt can also be improved.

The acid-modified diene-based polymer (B3) may be a diene-based polymer modified with a carboxylic acid or an acid anhydride, and specifically, may be a diene-based polymer having a carboxyl group and/or an acid anhydride group. A modification method with an acid is not particularly limited as long as a carboxyl group and/or an acid anhydride group is introduced into a skeleton of the diene-based polymer. From the viewpoint of mechanical properties and the like, a method of introducing a monomer having a carboxyl group and/or an acid anhydride group by copolymerization is preferable. The form of copolymerization may be random copolymerization, block copolymerization, or the like, but graft copolymerization is preferable from the viewpoint of improving the adhesiveness to the elastomer.

Examples of the diene-based polymer include polybutadiene, polyisoprene, a styrene-butadiene copolymer, and an acrylonitrile-butadiene copolymer. These diene-based polymers can be used alone or in combination of two or more kinds thereof. Among these, a polybutadiene-based polymer containing a butadiene unit is preferable, and polybutadiene (1,4-butadiene homopolymer) is particularly preferable.

Examples of the monomer having a carboxyl group and/or an acid anhydride group include unsaturated monocarboxylic acids [e.g., (meth)acrylic acid, crotonic acid, isocrotonic acid, angelic acid], unsaturated dicarboxylic acids and acid anhydrides thereof [e.g., (anhydride) maleic acid, fumaric acid, (anhydride) citraconic acid, (anhydride) itaconic acid, mesaconic acid, etc.]. These monomers may be used alone or in combination of two or more kinds thereof. Among these monomers, an unsaturated monocarboxylic acid such as (meth)acrylic acid, an unsaturated dicarboxylic acid such as (anhydride) maleic acid, or an acid anhydride thereof is preferable, and (anhydride) maleic acid is particularly preferable, from the viewpoint of improving adhesiveness. The diene-based polymer modified with a dicarboxylic acid may be a polymer obtained by ring-opening an acid anhydride group of a diene-based polymer modified with a carboxylic anhydride. Furthermore, the carboxyl group may be in the form of a salt neutralized with an alkali (e.g., an alkali metal such as lithium, sodium, or potassium, or an alkaline earth metal such as calcium or magnesium).

The ratio of the monomer (monomer unit in the acid-modified diene-based polymer) may be 1 mol or more with respect to 1 mol of the diene-based polymer, and is, for example, 1 mol to 30 mol, preferably 3 mol to 25 mol, more preferably 5 mol to 20 mol, still more preferably 7 mol to 15 mol, and most preferably 9 mol to 13 mol. When the ratio of the monomer is too small, the adhesiveness to the elastomer may be reduced.

An acid value of the acid-modified diene-based polymer (B3) may be 10 mgKOH/g or more, and is, for example, 10 mgKOH/g to 500 mgKOH/g, preferably 20 mgKOH/g to 300 mgKOH/g, more preferably 30 mgKOH/g to 200 mgKOH/g, and most preferably 35 mgKOH/g to 150 mgKOH/g. When the acid value is too low, the adhesiveness to the elastomer may be decreased.

The number average molecular weight of the acid-modified diene-based polymer (B3) is, for example, 1000 to 300000, preferably 1500 to 10000, more preferably 2000 to 10000, still more preferably 3000 to 8000, and most preferably 4000 to 6000 in terms of polystyrene by gel permeation chromatography (GPC). When the molecular weight of the acid-modified diene-based polymer is too small, the adhesiveness to the elastomer may be reduced, whereas when the molecular weight is too large, the mechanical properties may be reduced.

The acid-modified diene-based polymer (B3) is preferably a (anhydride) maleic acid-modified diene-based polymer, more preferably a (anhydride) maleic acid polybutadiene, and most preferably a maleic acid-modified polybutadiene.

The concentration of the acid-modified diene-based polymer (B3) in the second treatment agent can be selected from the range of about 1 mass % to 15 mass %.

When the first treatment agent is the first treatment agent (A1), the concentration (concentration in terms of solid content) of the acid-modified diene-based polymer (B3) in the second treatment agent is, for example, 2.5 mass % to 15 mass %, preferably 3 mass % to 10 mass %, more preferably 3.5 mass % to 10 mass %, still more preferably 3.5 mass % to 8 mass %, and most preferably 4 mass % to 5 mass %. When the concentration of the acid-modified diene-based polymer (B3) is too low, the adhesiveness may be reduced, whereas when the concentration of the acid-modified diene-based polymer (B3) is too high, probably due to the too thick coating film, the coating film may be peeled off by friction with a roller during the adhesion treatment of the cord to generate residue, which may make it difficult to continue the treatment.

When the first treatment agent is the first treatment agent (A2), the concentration (concentration in terms of solid content) of the acid-modified diene-based polymer (B3) in the second treatment agent is, for example, 1 mass % to 15 mass %, preferably 3 mass % to 14 mass %, more preferably 5 mass % to 13 mass %, still more preferably 8 mass % to 12 mass %, and most preferably 9 mass % to 11 mass %. When the concentration of the acid-modified diene-based polymer (B3) is too low, the adhesiveness may be reduced, whereas when the concentration of the acid-modified diene-based polymer (B3) is too high, probably due to the too thick coating film, the coating film may be peeled off by friction with a roller during the adhesion treatment of the cord to generate residue, which may make it difficult to continue the treatment.

The mass of the acid-modified diene-based polymer (B3) can be selected from a range of about 0.05 to 2 times the total mass of the condensate (B1) and the unmodified latex (B2).

When the first treatment agent is the first treatment agent (A1), the mass (mass in terms of solid content) of the acid-modified diene-based polymer (B3) is, for example, 0.05 to 2 times, preferably 0.05 to 1.5 times, more preferably 0.1 to 1 times (e.g., 0.2 to 0.9 times), still more preferably 0.15 to 0.5 times, and most preferably 0.2 to 0.3 times the total mass (mass in terms of solid content) of the condensate (B1) and the unmodified latex (B2). When the ratio of the acid-modified diene-based polymer (B3) is too low, the adhesiveness may be reduced, whereas when the ratio of the acid-modified diene-based polymer (B3) is too high, probably due to the too thick coating film, the coating film may be peeled off by friction with a roller during the adhesion treatment of the cord to generate residue, which may make it difficult to continue the treatment.

When the first treatment agent is the first treatment agent (A2), the mass (in terms of solid content) of the acid-modified diene-based polymer (B3) is, for example, 0.1 to 2 times, preferably 0.3 to 1.8 times, more preferably 0.5 to 1.7 times, still more preferably 1 to 1.6 times, and most preferably 1.3 to 1.5 times the total mass (in terms of solid content) of the condensate (B1) and the unmodified latex (B2). When the ratio of the acid-modified diene-based polymer (B3) is too low, the adhesiveness may be reduced, whereas when the ratio of the acid-modified diene-based polymer (B3) is too high, probably due to the too thick coating film, the coating film may be peeled off by friction with a roller during the adhesion treatment of the cord to generate residue, which may make it difficult to continue the treatment.

(B4) Hydrophilic Solvent

In the present invention, the solvent of the second treatment agent may be the hydrophilic solvent (B4), and the environmental load is smaller than that of an organic solvent (particularly, a hydrophobic solvent). The hydrophilic solvent (B4) can be selected from the hydrophilic solvents exemplified as the hydrophilic solvents (A2-4) of the first treatment agent (A2), including the preferred embodiments.

The solid content (active ingredient) concentration in the second treatment agent may be, for example, 1 mass % to 70 mass %, preferably 5 mass % to 60 mass %, more preferably 10 mass % to 50 mass %, and most preferably 15 mass % to 40 mass %. When the solid content concentration is too low, the adhesiveness may be reduced, and when the solid content concentration is too high, a mass of the solid content may be formed on the surface of the treated cord.

(B5) Other Additives

The second treatment agent may contain, as other additives (B5), a reactive binder resin (e.g., an epoxy compound), a common additive (e.g., a crosslinking agent, a curing accelerator, a co-crosslinking agent, an adhesion improver, a filler, an anti-aging agent, a lubricant, a tackifier, a stabilizer, a coupling agent, a plasticizer, or a colorant), or the like, as long as the effects of the present invention are not impaired.

The ratio of the other additives (B5) may be 30 mass % or less with respect to the whole second treatment agent, and is, for example, 0.01 mass % to 30 mass %, preferably 0.05 mass % to 20 mass %, and more preferably 0.1 mass % to 10 mass %.

The second treatment agent preferably contains substantially no halogen, and particularly preferably contains no halogen, from the viewpoint of reducing environmental load.

(Treatment Method)

A method for preparing the second treatment agent is not particularly limited. For example, the second treatment agent may be prepared by mixing all at once by stirring, or by dividing and mixing by stirring.

A method for treating the first treated yarn with the second treatment agent is not particularly limited, and examples thereof include spraying, coating, and immersion. Among these treatment methods, immersion is widely used. An immersion time is, for example, 1 second to 120 seconds, preferably 5 seconds to 60 seconds, and more preferably 10 seconds to 30 seconds.

The first treated yarn may be dried as necessary after being treated with the second treatment agent. A drying temperature is, for example, 100° C. to 250° C., preferably 150° C. to 240° C., and more preferably 170° C. to 220° C. A drying time is, for example, 10 seconds to 10 minutes, preferably 30 seconds to 5 minutes, and more preferably 1 minute to 3 minutes. Furthermore, the drying may be performed by applying tension to the first treated yarn. The tension may be, for example, about 5 N to 15 N. and preferably about 10 N to 15 N. When the first treated yarn is dried under the action of tension, the treatment agent is easily adapted to the first treated yarn, unevenness in twisting can be reduced, and variation in the diameter of the twisted yarn cord caused by unevenness in twisting can be reduced.

An average thickness of the coating film formed by the second treatment agent is, for example, 0.05 μm to 30 μm, preferably 0.1 μm to 10 μm, more preferably 0.3 μm to 5 μm, still more preferably 1 μm to 4.5 μm, and most preferably 3 μm to 4 μm. When the thickness of the coating film formed by the second treatment agent is too thin, the adhesive strength between the cord and the elastomer may be reduced, and when the thickness of the coating film is too thick, the shear adhesive strength between the cord and the elastomer may be reduced.

The production method according to the present invention includes the first treatment step and the second treatment step, and preferably does not include a step of performing an overcoat treatment with a mucilage. The production method according to the present invention can improve the adhesiveness between the cord and the elastomer even when the production method does not include a step of performing an overcoat treatment that causes an increase in the number of steps and an increase in the environmental load due to the use of an organic solvent. Therefore, the number of steps and the environmental load can be reduced.

<Cord for Power Transmission Belt>

The cord for a power transmission belt obtained by the production method according to the present invention is a cord for a power transmission belt in which a resin component is provided on the surface thereof and between the fibers by the production method, and includes at least the resin component (A), the condensate (B1) of resorcin and formaldehyde, the unmodified latex (B2), and the acid-modified diene-based polymer (B3) on the surface and between the fibers.

The cord obtained by the production method according to the present invention is suitable for use in a power transmission belt, and is usually used in contact with a rubber layer of the power transmission belt, and is preferably used by being embedded in the rubber layer. The rubber layer is formed of a rubber composition containing an elastomer, and can be appropriately selected depending on the application of the power transmission belt and the like. For example, in the case of a raw-edge cogged V-belt, the rubber layer may be an adhesive rubber layer formed of a rubber composition.

Examples of an elastomer include a diene-based rubber [natural rubber, isoprene rubber, butadiene rubber, chloroprene rubber, styrene-butadiene rubber (SBR), acrylonitrile-butadiene rubber (nitrile rubber), hydrogenated nitrile rubber, etc.], an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, and a fluororubber. These elastomers may be used alone or in combination of two or more kinds thereof.

Among these, the ethylene-α-olefin elastomer such as an ethylene-propylene copolymer (EPM) and an ethylene-propylene-diene terpolymer (EPDM) is preferable, and EPDM is particularly preferable, from the viewpoint of being excellent in ozone resistance, heat resistance, cold resistance, and weather resistance, and capable of reducing the belt weight. In the present invention, even when the elastomer is an ethylene-α-olefin elastomer, the adhesiveness between the rubber layer and the cord can be improved.

In the EPDM, the ratio (mass ratio) of ethylene to propylene is, expressed as former/later, 35/65 to 90/10, preferably 40/60 to 80/20, more preferably 45/55 to 70/30, and most preferably 50/50 to 60/40.

The diene content of the ethylene-α-olefin elastomer (in particular, ethylene-α-olefin-diene terpolymer rubber such as EPDM) may be 10 mass % or less, and is, for example, 0.1 mass % to 10 mass %, preferably 0.5 mass % to 8 mass %, more preferably 1 mass % to 7 mass %, and most preferably 2 mass % to 6 mass %. When the diene content is too large, the heat resistance may be decreased.

In the present application, the diene content means a mass ratio of the diene monomer unit in all units constituting the ethylene-α-olefin elastomer, and can be measured by a common method, but may be a monomer ratio.

When the elastomer contains an ethylene-α-olefin elastomer, the ratio of the ethylene-α-olefin elastomer in the elastomer may be 50 mass % or more (particularly about 80 mass % to 100 mass %), and is particularly preferably 100 mass % (only the ethylene-α-olefin elastomer).

The rubber composition may contain a common vulcanizing agent or crosslinking agent in addition to the elastomer. When the elastomer is an ethylene-α-olefin elastomer, the crosslinking agent may be an organic peroxide.

Examples of the organic peroxide include diacyl peroxide (dilauroyl peroxide, dibenzoyl peroxide, etc.), peroxyketal [1,1-di(t-butylperoxy)cyclohexane, 2,2-di(t-butylperoxy)butane, etc.], alkylperoxyester (t-butylperoxybenzoate, etc.), dialkyl peroxide [di-t-butylperoxide, dicumyl peroxide, t-butylcumyl peroxide, 2,5-dimethyl-2,5-di(t-butylperoxy)hexane, 2,5-dimethyl-2,5-di(t-butylperoxy)hexyne-3, 1,1-di(t-butylperoxy)-3,3,5-trimethylcyclohexane, 1,3-bis(2-t-butylperoxyisopropyl)benzene, 2,5-di-methyl-2,5-di(benzoylperoxy)hexane, etc.], peroxycarbonate (t-butylperoxyisopropyl carbonate, t-butylperoxy-2-ethylhexyl carbonate, t-amylperoxy-2-ethylhexyl carbonate, etc.). These organic peroxides may be used alone or in combination of two or more kinds thereof. Among these, dialkyl peroxides such as 1,3-bis(2-t-butylperoxyisopropyl)benzene are preferable.

The ratio of the vulcanizing agent or crosslinking agent (particularly, organic peroxide) is, for example, 0.1 part by mass to 30 parts by mass, preferably 1 part by mass to 20 parts by mass, more preferably 3 parts by mass to 15 parts by mass, and most preferably 5 parts by mass to 10 parts by mass with respect to 100 parts by mass of the elastomer.

The rubber composition may further contain a common reinforcing agent. Examples of the common reinforcing agent include carbon black, silica, clay, calcium carbonate, talc, mica, and short fibers. These reinforcing agents can be used alone or in combination of two or more kinds thereof.

The ratio of the reinforcing agent is, for example, 10 parts by mass to 200 parts by mass, preferably 20 parts by mass to 150 parts by mass, more preferably 30 parts by mass to 100 parts by mass, and most preferably 50 parts by mass to 80 parts by mass with respect to 100 parts by mass of the elastomer.

The rubber composition according to the present invention may further contain a common additive used as a compounding agent for rubber. Examples of the common additive include a co-crosslinking agent (bismaleimides, etc.), a vulcanization aid or a vulcanization accelerator (thiuram accelerator, etc.), a vulcanization retarder, a metal oxide (zinc oxide, magnesium oxide, calcium oxide, barium oxide, iron oxide, copper oxide, titanium oxide, aluminum oxide, etc.), a softener (oils such as paraffin oil and naphthenic oil, etc.), a processing agent or a processing aid (stearic acid, metal stearate, wax, paraffin, fatty acid amide, etc.), a silane coupling agent, an anti-aging agent (antioxidant, heat-aging resister, bending crack inhibitor, ozone deterioration inhibitor, etc.), a colorant, a tackifier, a stabilizer (ultraviolet absorber, heat stabilizer, etc.), a flame retardant, and an antistatic agent. These additives may be used alone or in combination of two or more kinds thereof. The metal oxide may act as a crosslinking agent.

The total ratio of the common additive is, for example, 5 parts by mass to 50 parts by mass, preferably 10 parts by mass to 30 parts by mass, and more preferably 15 parts by mass to 25 parts by mass with respect to 100 parts by mass of the elastomer.

The cord for a power transmission belt may be an aramid cord obtained by the production method described above. That is, the aramid cord for a power transmission belt may be an aramid-based multifilament yarn (for example, a twisted yarn cord) treated (for example, coated or impregnated) with the first treatment agent and the second treatment agent.

An average diameter of the cord for a power transmission belt is, for example, 0.3 mm to 3.6 mm, preferably 0.5 mm to 3.1 mm, and more preferably 0.6 mm to 2.7 mm.

<Power Transmission Belt and Method for Producing Same>

The power transmission belt includes the cord for the power transmission belt, and is usually a power transmission belt including a rubber layer in which the cord for the power transmission belt (in particular, a plurality of cords for the power transmission belt) is embedded along the longitudinal direction (or the circumferential direction) of the belt in many cases. An interval (spinning pitch) between adjacent cords is, for example, 0.5 mm to 4 mm, preferably 0.6 mm to 2.5 mm, and more preferably 0.7 mm to 2.3 mm.

Typically, the power transmission belt may be a power transmission belt including an adhesive rubber layer and a compression rubber layer on one surface of the adhesive rubber layer, in which a cord for the power transmission belt is embedded in the adhesive rubber layer. A tension rubber layer may be provided on the other surface of the adhesive rubber layer. In addition, in the power transmission belt, a part of a belt main body formed of the rubber layer (for example, the surface of the tension rubber layer and/or the compression rubber layer) or the whole thereof may be covered (or laminated) with a reinforcing fabric.

Examples of such a power transmission belt include a V-belt such as a wrapped V-belt and a raw-edge V-belt, a V-ribbed belt, a flat belt, and a toothed belt.

FIG. 1 is a schematic cross-sectional view showing a V-ribbed belt as an example of the power transmission belt including the cord for a power transmission belt obtained by the production method according to the present invention. In this example, the belt includes an adhesive rubber layer 2 in which cords 1 for a power transmission belt are embedded in a longitudinal direction of the belt, a compression rubber layer 3 formed on one surface (inner peripheral surface) of the adhesive rubber layer, and a tension rubber layer 4 formed on the other surface (outer peripheral surface or back surface) of the adhesive rubber layer, and V-shaped groove ribs 5 are formed on the compression rubber layer 3. The compression rubber layer 3 contains short fibers 6 in order to improve lateral pressure resistance of the power transmission belt. The adhesive rubber layer 2, the compression rubber layer 3, and the tension rubber layer 4 are preferably formed of a rubber composition containing an ethylene-α-olefin elastomer or the like. Further, a reinforcing fabric formed of a woven fabric, a nonwoven fabric, a knitted fabric, or the like may be laminated on the back surface of the tensile rubber layer 4.

Figure 2:
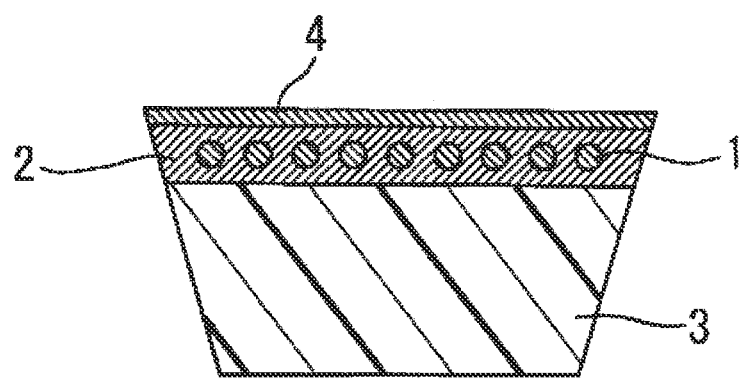
FIG. 2 is a schematic cross-sectional view showing another example of a power transmission belt including a cord for a power transmission belt obtained by the production method according to the present invention.

FIG. 2 is a schematic cross-sectional view showing a raw-edge V-belt which is another example of a power transmission belt including a cord for a power transmission belt obtained by the production method according to the present invention. The belt shown in FIG. 2 is configured in the same manner as the V-ribbed belt shown in FIG. 1 except that the ribs 5 are not formed on the compression rubber layer 3 and that the belt has a trapezoidal shape in which a belt width is decreased from an outer peripheral surface toward an inner peripheral surface. In the compression rubber layer 3, a plurality of cogs (convex portions) may be formed at predetermined intervals along the longitudinal direction of the belt. The reinforcing fabric formed of a woven fabric, a nonwoven fabric, a knitted fabric, and the like may be laminated on the surface (inner peripheral surface) of the compression rubber layer 3 and the surface (outer peripheral surface) of the tension rubber layer 4.

These power transmission belts are formed, for example, by sequentially winding a sheet for a compression rubber layer and a sheet for a first adhesive rubber layer around a cylindrical forming drum, spirally spinning a cord for a transmission belt thereon, further sequentially winding a sheet for a second adhesive rubber layer and a sheet for a tension rubber layer to form a laminate, vulcanizing the laminate to prepare a vulcanized belt sleeve, and cutting the cylindrical vulcanized belt sleeve in the circumferential direction. At the time of this cutting, the cord for the power transmission belt arranged or oriented in the circumferential direction is also cut, and the cord for the power transmission belt is exposed to the side surface (cut surface) of the power transmission belt. When the cord for the transmission belt is exposed to the side surface of the transmission belt, the yarn of the cord is easily loosened, and a pop out occurs in which the cord for the transmission belt protrudes from the side surface of the transmission belt with the yarn loosened from the side surface of the transmission belt as a starting point, and the popped out cord for the transmission belt may be wound around a shaft of a rotating pulley to break the power transmission belt. However, in the power transmission belt shown in FIG. 1 and FIG. 2, since the cord for a power transmission belt treated with the specific treatment agent is embedded in the adhesive rubber layer and the binding property between the filaments of the cord for a power transmission belt is high, the cord for a power transmission belt is not loosened on the side surface of the power transmission belt, popping out of the cord for a power transmission belt can be effectively prevented, and the durability of the power transmission belt can be significantly improved.

The power transmission belt is not limited to the V-ribbed belt and the raw-edge V-belt, and can also be used as a toothed belt, a flat belt, or the like.

The method for producing the power transmission belt is not limited to the method described above, and examples thereof include a common method including an embedding step of embedding the cord in the rubber layer along the longitudinal direction of the belt according to the type of the belt, for example, a method in which a cylindrical laminate in which an aramid core treated with a specific treatment agent is sandwiched between a pair of unvulcanized rubber sheets (including unvulcanized laminated rubber sheets) is vulcanized to prepare a power transmission belt precursor (vulcanized belt sleeve), and the cylindrical power transmission belt precursor is cut in the circumferential direction. In the present invention, even when cutting is performed in this manner, fluffing or fraying of the aramid cord is not generated on the side surface of the power transmission belt. The pair of unvulcanized rubber sheets may be the same or different, and are often formed of a rubber composition containing an ethylene-α-olefin elastomer.

EXAMPLE

The present invention is described below in detail based on examples. However, the present invention is not limited by the examples.

Examples 1 to 9, Reference Examples 1 to 4, and Comparative Examples 1 to 5

(Preparation of Twisted Cord)

Two raw yarns ("Twaron 1014" manufactured by Teijin Ltd., 1680 dtex, the number of filaments: 1000) were aligned, and were subjected to primary twist in an S direction at the number of twists of 15 times/10 cm to prepare a primary twisted yarn, and three primary twisted yarns were aligned, and were subjected to secondary twist in a Z direction at the number of twists of 20 times/10 cm to prepare plied twists in which the primary twist and the secondary twist were reversed in a twist direction.

(Preparation of First Treatment Agent A1)

A modified epoxy resin, a curing agent, and toluene were mixed at ratios shown in Table 1, and the mixture was stirred at room temperature for 10 minutes to prepare the first treatment agent A1.

TABLE 1

(Epoxy-based treatment)

| | Blending amount (part by mass) | Solid content (part by mass) |
|---|---|---|
| Modified epoxy resin | 100 | 100 |
| Curing agent | 5 | 5 |
| Toluene | 1000 | 0 |
| Total | 1105 | 105 |
| Total solid content concentration | | 9.5 mass % |

Details of the modified epoxy resin and the curing agent in Table 1 are as follows.

Modified epoxy resin: NBR modified epoxy resin, "EPR-2000" manufactured by ADEKA Corporation Curing agent: 2,4,6-tris(dimethylaminomethyl)phenol, "Daitocural HD-Acc43" manufactured by Daito Sangyo Co., Ltd.

(Preparation of First Treatment Agent A2)

Liquid C was mixed with a mixed liquid of liquid A and liquid B at ratios shown in Table 2, and the mixture was stirred at room temperature for 10 minutes to prepare the first treatment agent A2.

TABLE 2

(Carbodiimide-based treatment)

| | | Blending amount (part by mass) | Solid content (part by mass) |
|---|---|---|---|
| Liquid A | Resorcin | 20 | 20 |
| | Water | 91.5 | 0 |
| | Formalin | 13.5 | 5 |
| Liquid B | Latex 1 | 263.2 | 100 |
| | Water | 236.8 | 0 |
| Liquid C | Carbodiimide | 2.5 | 1 |
| | Water | 97.5 | 0 |
| | Total | 725 | 126 |
| Total solid content concentration | | | 17 mass % |

Details of Latex 1 and carbodiimide in Table 2 are as follows.

Latex 1: carboxyl-modified NBR latex, "Nipol 1571CL" manufactured by Zeon Corporation, active ingredient: 38% by mass Carbodiimide: polycarbodiimide dispersion liquid, "Carbodilite E-05" manufactured by Nisshinbo Chemical Inc., active ingredient: 40 mass %, NCN equivalent: 310

(Preparation of Second Treatment Agent)

Liquid D and liquid E were mixed at ratios shown in Table 3, and stirred at room temperature for 10 minutes to prepare an RFL liquid, and a maleic acid-modified polybutadiene dispersion liquid and water were added to the obtained an RFL liquid at ratios shown in Tables 6 to 8, and the mixture was stirred at room temperature for 10 minutes to prepare a second treatment agent.

TABLE 3

(RFL liquid of second treatment agent)

| | | Blending amount (part by mass) | Solid content (part by mass) |
|---|---|---|---|
| Liquid D | Resorcin | 36 | 36 |
| | Water | 165 | 0 |
| | Formalin | 25 | 9 |

TABLE 3-continued (RFL liquid of second treatment agent)

| | | Blending amount (part by mass) | Solid content (part by mass) |
|---|---|---|---|
| Liquid E | Latex 2 | 247 | 100 |
| | Water | 102 | 0 |
| | Total | 575 | 145 |
| Total solid content concentration | | | 25 mass % |

Details of Latex 2 in Table 3 and the maleic acid-modified polybutadiene dispersions in Tables 6 to 8 are as follows.

Latex 2: styrene-butadiene-vinylpyridine latex, "Nipol 2518FS" manufactured by Zeon Corporation, active ingredient: 40.5 mass %

Maleic acid-modified polybutadiene dispersion liquid: "Ricobond 7004" manufactured by Cray-valley Co., Ltd., solid content concentration: 30 mass %

(Immersion Treatment of Twisted Cord)

In Examples 1 to 5, Reference Examples 1 and 2, and Comparative Examples 1 and 2, the obtained twisted cords were subjected to a two-bath treatment of the first treatment agent A1 and the second treatment agent in this order as described below to obtain treated cords.

That is, the untreated twisted cord was immersed in the first treatment agent A1 for 30 seconds and dried at 190° C. for 1 minute to obtain a first treated yarn (first treatment step). Next, the first treated yarn was immersed in the second treatment agent for 15 seconds and dried at 200° C. for 2 minutes to obtain a second treated yarn (second treatment step).

On the other hand, in Examples 6 to 9, Reference Examples 3 and 4, and Comparative Examples 3 and 4, second treated yarns were obtained in the same manner as in Examples 1 to 5, Reference Examples 1 and 2, and Comparative Examples 1 and 2, except that, in the first treatment step, the first treated yarn was obtained by immersing the untreated twisted cord for 30 seconds using the first treatment agent A2 instead of the first treatment agent A1 and then drying the first treated yarn at 150° C. for 1 minute.

In Comparative Example 5, the untreated twisted cord was immersed in the second treatment agent for 15 seconds without undergoing the first treatment step, and dried at 200° C. for 2 minutes to obtain a second treated yarn.

(Preparation of Sheet for Adhesive Rubber Layer)

A sheet for an adhesive rubber layer was prepared by kneading compositions having proportion shown in Table 4 with a Banbury mixer, and rolling the kneaded mixture into a predetermined thickness with a calendar roll.

TABLE 4

(Composition for adhesive rubber layer)

| | Blending amount (part by mass) |
|---|---|
| EPDM1 | 100 |
| Carbon black FEF | 20 |
| Silica | 50 |
| Paraffinic-based oil | 15 |
| Anti-aging agent | 1 |
| Zinc oxide | 5 |
| Organic peroxide | 8 |
| Total | 199 |

The details of the components in Table 4 are as follows.

EPDM1: "EP24" manufactured by JSR Corporation, ethylene content: 54 mass %, diene content: 4.5 mass %

Carbon black FEF: "N550" manufactured by Cabot Japan K.K.

Silica: "Ultrasil VN3" manufactured by Evonik Degussa Japan, Inc., BET specific surface area: 175 m$^2$/g Paraffinic-based oil: "Diana Process Oil PW-90" manufactured by Idemitsu Kosan Co., Ltd.

Anti-aging agent: 4,4'-bis($\alpha,\alpha$-dimethylbenzyl)diphenylamine, "Nocrac CD" manufactured by Ouchi Shinko Chemical Industrial Co., Ltd.

Zinc oxide: "Zinc oxide II" manufactured by Sakai Chemical Industry Co., Ltd.

Organic peroxide: $\alpha,\alpha'$-bis(t-butylperoxy)diisopropylbenzene, "P-40MB (K)" manufactured by NOF Corporation, active ingredient: 40 mass %

(Preparation of Sheet for Compression Rubber Layer and Tension Rubber Layer)

The sheet for the compression rubber layer and the tension rubber layer were prepared by kneading the compositions shown in Table 5 with a Banbury mixer and rolling the kneaded composition to a predetermined thickness with a calendar roll.

TABLE 5

(Compositions for compression rubber layer and tension rubber layer)

|  | Blending amount (part by mass) |
|---|---|
| EPDM2 | 100 |
| Polyamide short fiber | 30 |
| Carbon black HAF | 65 |
| Paraffinic-based oil | 5 |
| Anti-aging agent | 2 |
| Zinc oxide | 5 |
| Stearic acid | 2 |
| Co-crosslinking agent | 4 |
| Organic peroxide | 8 |
| Total | 221 |

The details of the components in Table 5 are as follows.

EPDM2: "EP93" manufactured by JSR Corporation, ethylene content: 55 mass %, diene content: 2.7 mass %

Polyamide short fiber: "Twaron" manufactured by Teijin Ltd., average fiber length: 3 mm Carbon black HAF: "N330" manufactured by Cabot Japan K.K.

Paraffinic-based oil: "Diana Process Oil PW-90" manufactured by Idemitsu Kosan Co., Ltd.

Anti-aging agent: 4,4'-bis($\alpha,\alpha$-dimethylbenzyl)diphenylamine, "Nocrac CD" manufactured by Ouchi Shinko Chemical Industrial Co., Ltd.

Zinc oxide: "zinc oxide II" manufactured by Sakai Chemical Industry Co., Ltd.

Stearic acid: "stearic acid beads Tsubaki" manufactured by NOF Corporation

Co-crosslinking agent: N,N'-m-phenylenedimaleimide, "VULNOC PM" manufactured by Ouchi Shinko Chemical Industrial Co., Ltd.

Organic peroxide: $\alpha,\alpha'$-bis(t-butylperoxy)diisopropylbenzene, "P-40 MB (K)" manufactured by NOF Corporation, active ingredient: 40 mass %

(Preparation of Power Transmission Belt)

A laminate of a reinforcing fabric (thickness: 0.5 mm, polyamide canvas having a configuration of 2/2 twill weave) and a sheet for a compression rubber layer (unvulcanized rubber) was placed in a flat cogged mold in which tooth portions and groove portions were alternately arranged with the reinforcing fabric facing downward, pressed with pressure at 75° C. to prepare a cog pad (not completely vulcanized but in a semi-vulcanized state) in which the cog portions were formed. Next, both ends of the cog pad were vertically cut from the top of a cog hill portion.

A cylindrical mold was covered with an inner mother mold having tooth portions and groove portions alternately provided, the cog pad was wound by engaging with the tooth portions and groove portions to joint at the top of the cog hill portion, a sheet for an adhesive rubber layer (unvulcanized rubber) was laminated on the wound cog pad, the cord was spun spirally, and a sheet for an adhesive rubber layer (the same as the above sheet for an adhesive rubber layer) and a sheet for a tension rubber layer (unvulcanized rubber) were sequentially wound thereon to prepare a formed body. After that, it was covered with an outer mother mold having tooth portions and groove portions alternately provided and a jacket, the mold was then placed in a vulcanizing can, and the mold was vulcanized at a temperature of 170° C. for 40 minutes to obtain a belt sleeve. This sleeve was cut into a V shape by a cutter to prepare a raw-edge double cogged V-belt (size: upper width 35.0 mm, thickness (distance from inner peripheral cog hill portion to outer peripheral cog hill portion) 15.0 mm, V angle 28°, cog height (inner peripheral side) 6.0 mm, cog height (outer peripheral side) 2.8 mm, belt outer peripheral length 1100 mm), which was a variable speed belt having cogs on the inner peripheral side and outer peripheral side of the belt.

(Peeling Test)

Figure 3:
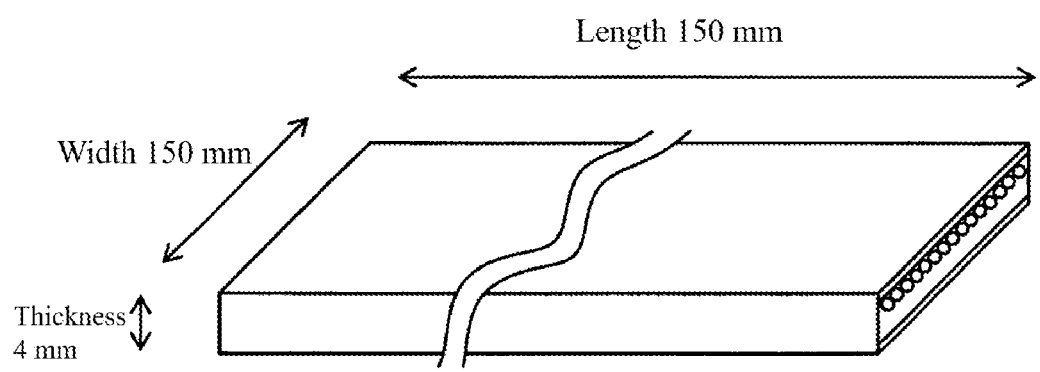
FIG. 3 is a schematic perspective view of a sample for a peeling test used in a peeling test of Example.

A treated cord was spirally wound around the outer periphery of a cylinder having an outer diameter of 150 mm without any gap until the width became 30 mm. An adhesive tape was attached onto the wound treated cord, and then the treated cord was cut to a length of 150 mm. A laminate of the adhesive tape and the treated cord was inserted into a mold having a width of 30 mm, a length of 150 mm, and a depth of 4 mm so that the surface of the adhesive tape faced downward (so as to be in contact with a bottom surface of the mold). Then, the unvulcanized rubber sheet for the compression rubber layer was provided on the treated cord so that a length direction of the short fibers and a length direction of the treated cord were parallel to each other. A reinforcing fabric was placed thereon and vulcanized at a surface pressure of 2 MPa and a temperature of 170° C. for 40 minutes. The vulcanized laminate was cut to have a width of 25 mm, and as shown in FIG. 3, a sample for a peeling test having a width of 25 mm, a length of 150 mm, and a thickness of 4 mm was prepared.

Figure 4:
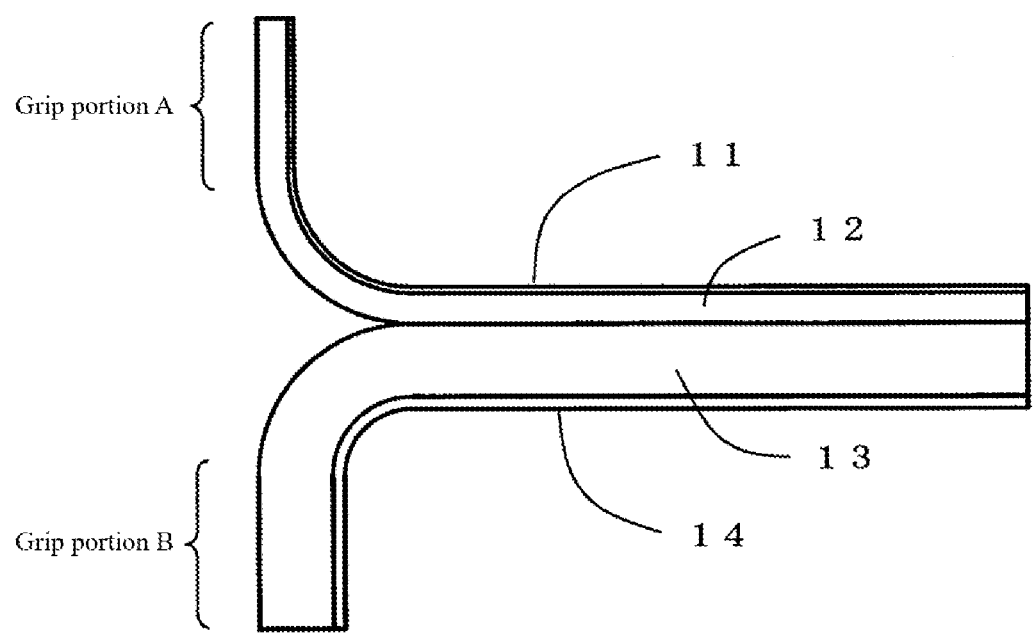
FIG. 4 is a schematic view for showing a method of measuring a peeling test of Example.

As shown in FIG. 4, at one end portion in the length direction of the prepared sample for a peeling test, a cut was made in an interface portion between the treated cord 12 and the vulcanized rubber 13 by a blade, and the cut was separated into a grip portion A in which the adhesive tape 11 and the treated cord 12 were laminated and a grip portion B (the length of the grip portion was about 30 mm) in which the vulcanized rubber 13 and the reinforcing fabric 14 were laminated.

The grip portion A was gripped by an upper grip of a tensile tester ("AGS-J10kN" manufactured by Shimadzu Corporation), the grip portion B was gripped by a lower grip, and the upper grip was raised at a speed of 50 mm/min to record a tensile force. A measurement time was 2 minutes so that a moving distance of the upper grip and a peeled portion were about 100 mm. A test temperature (ambient temperature) was at two levels of 23° C. and 120° C. and the sample for the peeling test was measured after being left at the test temperature for 3 hours or more. The tensile force shows a wavy curve, and the average value thereof was determined in accordance with an E method of JIS K6274 (2018). That is, an initial rising curve at a start of the test was ignored, and the average value of the maximum value and the minimum value among all the peaks of the wavy curve was obtained. The obtained average value was divided by the width of the sample to obtain the peeling strength per 1 cm width.

(Durability Test)

Figure 5:
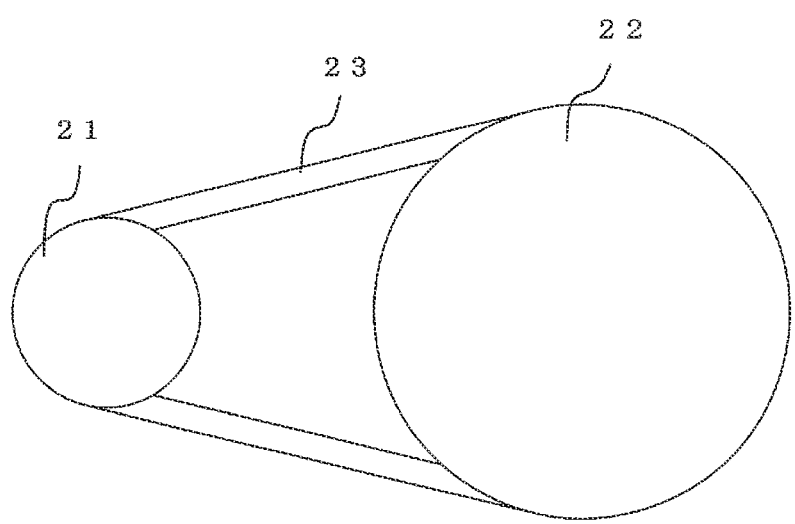
FIG. 5 is a schematic view showing a layout of a durability running test of Example.

As shown in FIG. 5, a durability test was performed using a biaxial running tester including a drive pulley 21 (having an outer diameter of 110 mm, a V-groove upper width of 35 mm, and a V-groove angle of 26°) and a driven pulley 22 (having an outer diameter of 240 mm, a V-groove upper width of 35 mm, and a V-groove angle of 26°). A raw-edge double cogged V-belt 23 was hung on each pulley, a rotation speed of the drive pulley was set to 6000 rpm, a load on the driven pulley was set to 25 kW, an axial load (deadweight) was set to 2000 N, and the belt was caused to run at an ambient temperature of 80° C. for 70 hours. A side surface of the compression rubber after the durability test (the surface in contact with the pulley) was visually observed to confirm the presence or absence of peeling between the cord and the elastomer, and when peeling was observed, a length of the peeling was measured. The length of peeling means a length extending in the circumferential direction of the belt. When peeling was observed at a plurality of locations, the maximum length of the peeling was defined as the length of peeling.

The evaluation results of Examples, Reference Examples, and Comparative Examples are shown in Tables 6 to 8. In Tables 6 to 8, the blending amount, the solid content, and the concentration are all on a mass basis.

TABLE 6

(First treatment agent A1)

| | Example 1 | | Example 2 | | Example 3 | | Example 4 | | Example 5 | |
|---|---|---|---|---|---|---|---|---|---|---|
| | Blending amount | Solid content | Blending amount | Solid content | Blending amount | Solid content | Blending amount | Solid content | Blending amount | Solid content |
| RFL | 575 | 145 | 575 | 145 | 575 | 145 | 575 | 145 | 575 | 145 |
| Maleic acid-modified polybutadiene dispersion liquid | 80 | 24 | 120 | 36 | 400 | 120 | 120 | 36 | 800 | 240 |
| Water | 140 | 0 | 158 | 0 | 275 | 0 | 650 | 0 | 440 | 0 |
| Total | 795 | 169 | 853 | 181 | 1250 | 265 | 1345 | 181 | 1815 | 385 |
| RFL concentration | 18.2% | | 17.0% | | 11.6% | | 10.8% | | 8.0% | |
| Maleic acid-modified polybutadiene concentration | 3.0% | | 4.2% | | 96% | | 2.7% | | 13.2% | |
| Total solid content | 21.2% | | 21.2% | | 21.2% | | 13.4% | | 21.2% | |
| Maleic acid-modified polybutadiene/RFL | 0.17 | | 0.25 | | 0.83 | | 0.25 | | 1.66 | |
| Peeling strength (23° C.) | 65 | | 109 | | 110 | | 70 | | 63 | |
| Peeling strength (120° C.) | 40 | | 52 | | 50 | | 43 | | 38 | |
| Peeling after durability | 2 mm | | No | | No | | 2 mm | | 2 mm | |

| | Reference Example 1 | | Reference Example 2 | | Comparative Example 1 | | Comparative Example 2 | |
|---|---|---|---|---|---|---|---|---|
| | Blending amount | Solid content | Blending amount | Solid content | Blending amount | Solid content | Blending amount | Solid content |
| RFL | 575 | 145 | 575 | 145 | 0 | 0 | 575 | 145 |
| Maleic acid-modified polybutadiene dispersion liquid | 45 | 13.5 | 120 | 36 | 120 | 36 | 0 | 0 |
| Water | 128 | 0 | 1500 | 0 | 50 | 0 | 110 | 0 |
| Total | 748 | 158.5 | 2195 | 181 | 170 | 36 | 685 | 145 |
| RFL concentration | 19.4% | | 6.6% | | 0% | | 21.2% | |
| Maleic acid-modified polybutadiene concentration | 1.8% | | 1.6% | | 21.2% | | 0% | |
| Total solid content | 21.2% | | 8.2% | | 21.2% | | 21.2% | |
| Maleic acid-modified polybutadiene/RFL | 0.09 | | 0.25 | | — | | 0 | |
| Peeling strength (23° C.) | 25 | | 27 | | Treatment could not be continued | | 20 | |
| Peeling strength (120° C.) | 13 | | 15 | | Treatment could not be continued | | 10 | |
| Peeling after durability | 4 mm | | 4 mm | | Treatment could not be continued | | 8 mm | |

TABLE 7

(First treatment agent A2)

| | Example 6 | | Example 7 | | Example 8 | | Example 9 | |
|---|---|---|---|---|---|---|---|---|
| | Blending amount | Solid content | Blending amount | Solid content | Blending amount | Solid content | Blending amount | Solid content |
| RFL | 575 | 145 | 575 | 145 | 575 | 145 | 575 | 145 |
| Maleic acid-modified polybutadiene dispersion liquid | 40 | 12 | 300 | 90 | 700 | 210 | 700 | 210 |
| Water | 350 | 0 | 570 | 0 | 900 | 0 | 1500 | 0 |
| Total | 965 | 157 | 1445 | 235 | 2175 | 355 | 2775 | 355 |
| RFL concentration | 15.0% | | 10.0% | | 6.7% | | 5.2% | |
| Maleic acid-modified polybutadiene concentration | 1.2% | | 6.2% | | 9.7% | | 7.6% | |
| Total solid content concentration | 16.3% | | 16.3% | | 16.3% | | 12.8% | |
| Maleic acid-modified polybutadiene/RFL | 0.08 | | 0.62 | | 1.45 | | 1.45 | |
| Peeling strength (23° C.) | 68 | | 106 | | 110 | | 73 | |
| Peeling strength (120° C.) | 48 | | 60 | | 62 | | 52 | |
| Peeling after durability | 1 mm | | No | | No | | No | |

| | Reference Example 3 | | Reference Example 4 | | Comparative Example 3 | | Comparative Example 4 | |
|---|---|---|---|---|---|---|---|---|
| | Blending amount | Solid content | Blending amount | Solid content | Blending amount | Solid content | Blending amount | Solid content |
| RFL | 575 | 145 | 575 | 145 | 0 | 0 | 575 | 145 |
| Maleic acid-modified polybutadiene dispersion liquid | 20 | 6 | 700 | 210 | 300 | 90 | 0 | 0 |
| Water | 330 | 0 | 6000 | 0 | 570 | 0 | 880 | 0 |
| Total | 925 | 151 | 7275 | 355 | 870 | 90 | 1455 | 145 |
| RFL concentration | 15.7% | | 2.0% | | 0% | | 10.0% | |
| Maleic acid-modified polybutadiene concentration | 0.6% | | 2.9% | | 10.3% | | 0% | |
| Total solid content concentration | 16.3% | | 4.9% | | 10.3% | | 10.0% | |
| Maleic acid-modified polybutadiene/RFL | 0.04 | | 1.45 | | — | | 0 | |
| Peeling strength (23° C.) | 30 | | 31 | | 20 | | 20 | |
| Peeling strength (120° C.) | 19 | | 20 | | 10 | | 10 | |
| Peeling after durability | 4 mm | | 4 mm | | 8 mm | | 8 mm | |

TABLE 8

(Without first treatment agent)

| | Comparative Example 5 | |
|---|---|---|
| | Blending amount | Solid content |
| RFL | 575 | 145 |
| Maleic acid-modified polybutadiene dispersion liquid | 300 | 90 |
| Water | 570 | 0 |
| Total | 1445 | 235 |
| RFL concentration | 10.0% | |
| Maleic acid-modified polybutadiene concentration | 6.2% | |
| Total solid content concentration | 16.3% | |
| Maleic acid-modified polybutadiene/RFL | 0.62 | |
| Peeling strength (23° C.) | 20 | |
| Peeling strength (120° C.) | 10 | |
| Peeling after durability | 8 mm | |

Table 6 shows the results of applying the first treatment agent A1 as the first treatment step, Table 7 shows the results of applying the first treatment agent A2 as the first treatment step, and Table 8 shows the results of subjecting the untreated twisted cord to the second treatment step without passing through the first treatment step.

In Table 6, in the case where the RFL concentration in the second treatment agent was 8.0 mass % to 18.2 mass % and the concentration of maleic acid-modified polybutadiene was 2.7 mass % to 13.2 mass %, the peeling strength was high, peeling after the durability test was absent or small, and good results were shown. In particular, Examples 2 and 3, in which the RFL concentration was in a range of 11.6 mass % to 17.0 mass % and the concentration of maleic acid-modified polybutadiene was in a range of 4.2 mass % to 9.6 mass %, exhibited high peeling strength. Reference Example 1 was an example in which the concentration of maleic acid-modified polybutadiene was low, and Reference Example 2 was an example in which the concentration of maleic acid-modified polybutadiene and the RFL were low. Reference Example 1 and Reference Example 2 exhibited low peeling strength. In addition, in Comparative Example 1 in which RFL was not contained, since the coating film was peeled off during the treatment and residue was generated, it was impossible to continue the treatment. In Comparative Example 2 in which no maleic acid-modified polybutadiene was contained, the peeling strength was low, and the peeling length after the durability test was long.

In Table 7, in the case where the RFL concentration in the second treatment agent was 5.2 mass % to 15 mass % and the concentration of the maleic acid-modified polybutadiene was 1.2 mass % to 9.7 mass %, the peeling strength was high, peeling after the durability test was absent or small, and good results were shown. In particular, Examples 7 and 8 in which the RFL concentration was in a range of 6.7 mass % to 10.0 mass % and the concentration of maleic acid-modified polybutadiene was in a range of 6.2 mass % to 9.7 mass % exhibited high peeling strength. Reference Example 3 is an example in which the concentration of maleic acid-modified polybutadiene was low, and Reference Example 4 is an example in which the RFL concentration was low, and the peeling strength was low in both cases. Comparative Example 3 is an example in which the second treatment liquid did not contain RFL, and the peeling strength was further reduced. Furthermore, Comparative Example 4 is an example in which the second treatment liquid did not contain acid-modified polybutadiene, and the results were the same as those of Comparative Example 3.

Since RFL and maleic acid-modified polybutadiene were mixed as the second treatment agent, focusing on the ratio therebetween, when the first treatment agent A1 was used, good results were obtained when the ratio of maleic acid-modified polybutadiene/RFL (mass ratio of solid content) was 0.17 to 1.66, and when the first treatment agent A2 was used, good results were obtained when the ratio was 0.08 to 1.45.

Table 8 shows the results of Comparative Example 5 in which the second treatment step was performed without performing the first treatment step, but the peeling strength was not improved as in the results of Comparative Examples 3 and 4.

INDUSTRIAL APPLICABILITY

A cord for a power transmission belt obtained by the production method according to the present invention is excellent in durability, and thus is suitable for use as a power transmission belt (for example, a friction power transmission belt such as a V-belt or a V-ribbed belt, or a meshing power transmission belt such as a toothed belt or a double-sided toothed belt). In addition, the cord for a power transmission belt obtained by the production method according to the present invention is excellent in adhesiveness to rubber, and thus is also suitable for a raw-edge V-belt, and is particularly suitable for a belt (for example, a raw-edge cogged V-belt such as a raw-edge double cogged V-belt) used in a transmission in which a speed ratio changes steplessly during running.

Although the present invention has been described above in detail and with reference to its specific embodiment, it is obvious for those skilled in the art that various modifications or changes can be made without departing from the spirit and scope of the present invention.

The present application is based on Japanese Patent Application No. 2019-136378 filed on Jul. 24, 2019 and Japanese Patent Application No. 2020-110650 filed on Jun. 26, 2020, the contents of which are incorporated herein by reference.

REFERENCE SIGNS LIST

1 Cord for power transmission belt
2 Adhesive rubber layer
3 Compression rubber layer
4 Tension rubber layer
5 Rib
6 Short fiber

The invention claimed is:

1. A method of producing a cord for a power transmission belt, the method comprising:
a first treatment step of treating an untreated yarn of a cord for a power transmission belt with a first treatment agent comprising a resin component (A) to obtain a first treated yarn, wherein the untreated yarn comprises raw material fibers comprising aramid fibers, and a rubber layer of the power transmission belt with which the cord is to come into contact comprises an ethylene-α-olefin elastomer; and
a second treatment step of treating the first treated yarn with a second treatment agent comprising a condensate (B1) of resorcin and formaldehyde, an unmodified styrene-butadiene-vinylpyridine latex (B2), and a maleic acid-modified polybutadiene (B3) to obtain a second treated yarn,
wherein the resin component (A) comprises an NBR modified epoxy resin (A1-1) modified with an elastic polymer, a total concentration (in terms of solid content) of the condensate (B1) and the unmodified styrene-butadiene-vinylpyridine latex (B2) is 8 mass % to 18.2 mass % in the second treatment agent, and a concentration (in terms of solid content) of the maleic acid-modified polybutadiene (B3) is 2.7 mass % to 13.2 mass % in the second treatment agent, or
wherein the resin component (A) comprises a condensate (A2-1) of resorcin and formaldehyde, a carboxyl-modified NBR latex (A2-2), and a curing agent (A2-3) comprising a polycarbodiimide resin having a plurality of carbodiimide groups, a total concentration (in terms of solid content) of the condensate (B1) and the unmodified styrene-butadiene-vinylpyridine latex (B2) is 5.2 mass % to 15 mass % in the second treatment agent, and a concentration (in terms of solid content) of the maleic acid-modified polybutadiene (B3) is 1.2 mass % to 9.7 mass % in the second treatment agent.

2. The production method according to claim 1, wherein the resin component (A) comprises the NBR modified epoxy resin (A1-1) modified with the elastic polymer, the total concentration (in terms of solid content) of the condensate (B1) and the unmodified styrene-butadiene-vinylpyridine latex (B2) is 8 mass % to 18.2 mass % in the second treatment agent, and the concentration (in terms of solid content) of the maleic acid-modified polybutadiene (B3) is 2.7 mass % to 13.2 mass % in the second treatment agent.

3. The production method according to claim 1, wherein the resin component (A) comprises the condensate (A2-1) of resorcin and formaldehyde, the carboxyl-modified NBR latex (A2-2), and the curing agent (A2-3) comprising the polycarbodiimide resin having the plurality of carbodiimide groups, the total concentration (in terms of solid content) of the condensate (B1) and the unmodified styrene-butadiene-vinylpyridine latex (B2) is 5.2 mass % to 15 mass % in the second treatment agent, and the concentration (in terms of solid content) of the maleic acid-modified polybutadiene (B3) is 1.2 mass % to 9.7 mass % in the second treatment agent.

4. The production method according to claim 1, wherein a mass (in terms of solid content) of the maleic acid-modified polybutadiene (B3) is 0.05 to 2 times a total mass (in terms of solid content) of the condensate (B1) and the unmodified styrene-butadiene-vinylpyridine latex (B2).

5. The production method according to claim 1, wherein the first treatment agent and the second treatment agent do not comprise halogen.

6. The production method according to claim 1, which does not comprise a step of performing an overcoat treatment with a mucilage.

7. A method of producing a power transmission belt, the method comprising an embedding step of embedding the cord obtained by the production method according to claim 1 in a rubber layer along a longitudinal direction of a belt.

8. The production method according to claim 7, wherein the rubber layer comprises an ethylene-α-olefin elastomer.

9. The production method according to claim 7, wherein the power transmission belt is a raw-edge V-belt.

\* \* \* \* \*